(12) United States Patent
Fukuma et al.

(10) Patent No.: US 12,053,101 B2
(45) Date of Patent: Aug. 6, 2024

(54) INFORMATION PROCESSING DEVICE, INFORMATION PROCESSING METHOD, AND RECORDING MEDIUM

(71) Applicant: SONY CORPORATION, Tokyo (JP)

(72) Inventors: Yohei Fukuma, Chiba (JP); Ayumi Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 611 days.

(21) Appl. No.: 17/273,523

(22) PCT Filed: Aug. 28, 2019

(86) PCT No.: PCT/JP2019/033639
§ 371 (c)(1),
(2) Date: Mar. 4, 2021

(87) PCT Pub. No.: WO2020/054415
PCT Pub. Date: Mar. 19, 2020

(65) Prior Publication Data
US 2021/0186219 A1    Jun. 24, 2021

(30) Foreign Application Priority Data
Sep. 11, 2018   (JP) ................. 2018-169813

(51) Int. Cl.
*A47C 7/62*    (2006.01)
*A61H 23/02*   (2006.01)
*G06F 3/01*    (2006.01)

(52) U.S. Cl.
CPC .......... *A47C 7/62* (2013.01); *A61H 23/0263* (2013.01); *G06F 3/011* (2013.01); *A61H 2201/0149* (2013.01)

(58) Field of Classification Search
CPC .............. A47C 7/62; A61H 23/0263; A61H 2201/0149; G06F 3/011; G06F 3/016
See application file for complete search history.

(56) References Cited

U.S. PATENT DOCUMENTS

RE36,699 E * 5/2000 Murayama ............. A61C 17/20
433/119
2009/0254013 A1* 10/2009 Kajiyama .......... A61H 15/0078
601/134

(Continued)

FOREIGN PATENT DOCUMENTS

CN    103970208 A    8/2014
CN    104731333 A    6/2015
(Continued)

*Primary Examiner* — Charles Cai
(74) *Attorney, Agent, or Firm* — Paratus Law Group, PLLC

(57) ABSTRACT

There is provided an information processing device, an information processing method, and a recording medium that can appropriately give the user the effect of vibration presented in association with the content. The information processing device includes a vibration control unit that individually controls vibration presented to a user in association with a content by each of a plurality of vibration presenting units on the basis of a characteristic of the user and positions of the vibration presenting units. The present technology can be applied to, for example, a system that presents vibration by a device that supports the users body, a device that the user wears, or a device that the user operates.

20 Claims, 18 Drawing Sheets

(56) References Cited

U.S. PATENT DOCUMENTS

| | | | | |
|---|---|---|---|---|
| 2010/0036297 A1* | 2/2010 | Kim | ............... | A61H 23/0236 601/49 |
| 2015/0070150 A1* | 3/2015 | Levesque | ......... | H04N 21/4884 340/407.1 |
| 2015/0268723 A1* | 9/2015 | Saboune | ............. | G11B 27/10 345/156 |
| 2020/0023753 A1* | 1/2020 | Alequin | ................ | B60Q 9/00 |

FOREIGN PATENT DOCUMENTS

| | | |
|---|---|---|
| CN | 104750245 A | 7/2015 |
| CN | 105306982 A | 2/2016 |
| CN | 106210743 A | 12/2016 |
| CN | 106843475 A | 6/2017 |
| EP | 3118723 A1 | 1/2017 |
| JP | 2001-285975 A | 10/2001 |
| JP | 2015-053048 A | 3/2015 |
| WO | WO 2018/008217 A1 | 1/2018 |

* cited by examiner

| PRESSURE (Pa) | VIBRATION CHARACTERISTIC |
|---|---|
| 1–10 | A |
| 10–11 | B |
| ... | ... |

PLEASE SHIFT YOUR WEIGHT BACKWARD

B

PLEASE LEAN FULLY AGAINST BACK OF CHAIR

C

PLEASE PLACE BOTH HANDS ON TABLE

FIG. 21

| PRESSURE (Pa) | RESONANCE POINT (Hz) | VIBRATION CHARACTERISTIC |
|---|---|---|
| 1-10 | 60 | A |
| 10-11 | 65 | B |
| ... | ... | ... |

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application N. PT/JP2019/033639 (filed on Aug. 28, 2019) under 35 U.S.C. § 371, which claims priority to Japanese Patent Application N. 2018-169813 (filed on Sep. 11, 2018), which are all hereby incorporated by reference in their entirty.

TECHNICAL FIELD

The present technology relates to an information processing device, an information processing method, and a recording medium, and more particularly to an information processing device, an information processing method, and a recording medium suitable for use in a case of presenting vibration in association with content.

BACKGROUND ART

Conventionally, in a chair-type sound device in which a vibration unit is integrated, there has been proposed a technology for obtaining a good sound effect by changing the vibration band of the vibration unit for the bass range according to the gender of the user (see Patent Document 1, for example).

Additionally, in recent years, in movie theaters and the like, a technology for enhancing a realistic feeling by vibrating a chair according to the content has been developed.

CITATION LIST

Patent Document

Patent Document 1: Japanese Patent Application Laid-Open No. 2001-285975

SUMMARY OF THE INVENTION

Problems to be Solved by the Invention

However, when the chair is vibrated according to the content, the resonance point of the vibration may deviate from the design value depending on the user's physique, sitting style, or the like, and there is a possibility that the expected effect is not given to the user. In Patent Document 1, this point is not particularly examined.

The present technology has been made in view of such a situation, and makes it possible to appropriately give the user the effect of vibration presented in association with the content.

Solutions to Problems

An information processing device of one aspect of the present technology includes a vibration control unit that individually controls vibration presented to a user in association with a content by each of a plurality of vibration presenting units on the basis of a characteristic of the user and positions of the vibration presenting units.

An information processing method of one aspect of the present technology includes individually controlling, by an information processing device, vibration presented to a user in association with a content by each of a plurality of vibration presenting units on the basis of a characteristic of the user and positions of the vibration presenting units.

A recording medium of one aspect of the present technology records a program to perform processing of individually controlling vibration presented to a user in association with a content by each of a plurality of vibration presenting units on the basis of a characteristic of the user and positions of the vibration presenting units.

In one aspect of the present technology, vibration presented to a user in association with a content by each of a plurality of vibration presenting units is individually controlled on the basis of a characteristic of the user and positions of the vibration presenting units.

BRIEF DESCRIPTION OF DRAWINGS

FIG. 17 is a diagram showing an example of a guidance screen.

FIG. 21 is a diagram showing a modification of vibration characteristic data.

MODE FOR CARRYING OUT THE INVENTION

Figure 1:
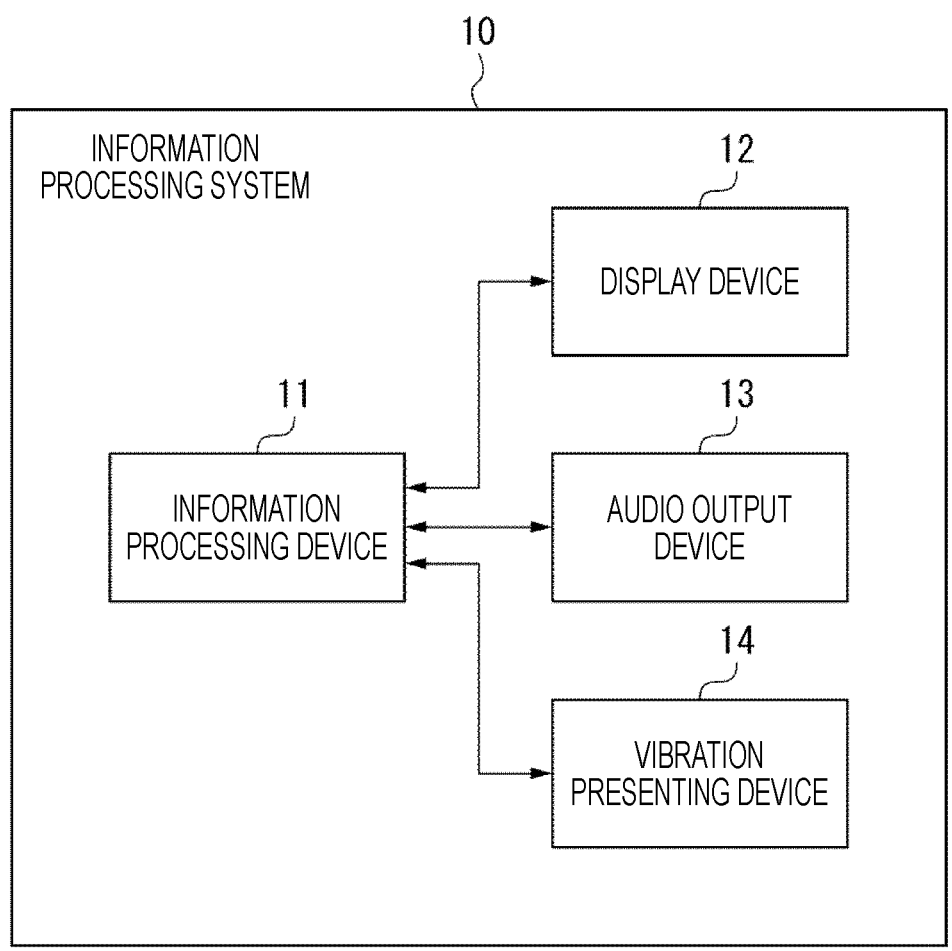
FIG. 1 is a block diagram showing an embodiment of an information processing system to which the present technology is applied.

Hereinafter, modes for carrying out the present technology will be described. Note that the description will be given in the following order.

1. First embodiment
2. Second embodiment
3. Third embodiment
4. Fourth embodiment
5. Fifth embodiment
6. Sixth embodiment
7. Seventh embodiment
8. Modification
9. Other

1. First Embodiment

First, a first embodiment of the present technology will be described with reference to FIGS. 1 to 12.

<Configuration Example of Information Processing System 10>

FIG. 1 is a block diagram showing a configuration example of an information processing system 10 to which the present technology is applied.

The information processing system 10 is a system capable of presenting vibration to a user in association with content including at least one of video or audio. The information processing system 1 includes an information processing device 11, a display device 12, an audio output device 13, and a vibration presenting device 14.

The information processing device 11 is a device that controls presentation of content and vibration. The information processing device 11 supplies video data included in content data to the display device 12, and controls the display of video by the display device 12. The information processing device 11 supplies audio data included in content data to the audio output device 13, and controls the output of audio by the audio output device 13. The information processing device 11 supplies vibration control data for presenting vibration in association with the content to the vibration presenting device 14, and controls the presentation of vibration by the vibration presenting device 14.

The display device 12 is a device that displays video included in the content under the control of the information processing device 11. The type of the display device 12 is not particularly limited, and is a display, a projector, a head-mounted display, or the like, for example.

The audio output device 13 is a device that outputs audio included in the content under the control of the information processing device 11. The type of the audio output device 13 is not particularly limited, and the type is a speaker, headphones, and the like, for example.

The vibration presenting device 14 is a device that presents vibration (provides vibration) to at least a part of the user's body (e.g., shoulders, hips, buttocks, or the like) under the control of the information processing device 11. The type of the vibration presenting device 14 is not particularly limited as long as it can present vibration to the user. For example, the shape of the vibration presenting device 14 can be any shape such as a sheet shape or a slate shape. Additionally, the vibration presenting device 14 may come into direct contact with the user's body, or may come into indirect contact with the user's body with clothes or the like interposed therebetween. For example, the vibration presenting device 14 includes a device that supports the user's body such as a chair type, a seat surface type, a bed type, or a floor type, a device worn by the user such as a clothing type, a bracelet type, or a glasses type, or a user-operated device such as a handle type, a lever type, or a pedal type.

Additionally, the vibration presenting device 14 includes various sensors and supplies sensor data indicating the detection result of each sensor to the information processing device 11.

<Configuration Example of Information Processing Device 11>

Figure 2:
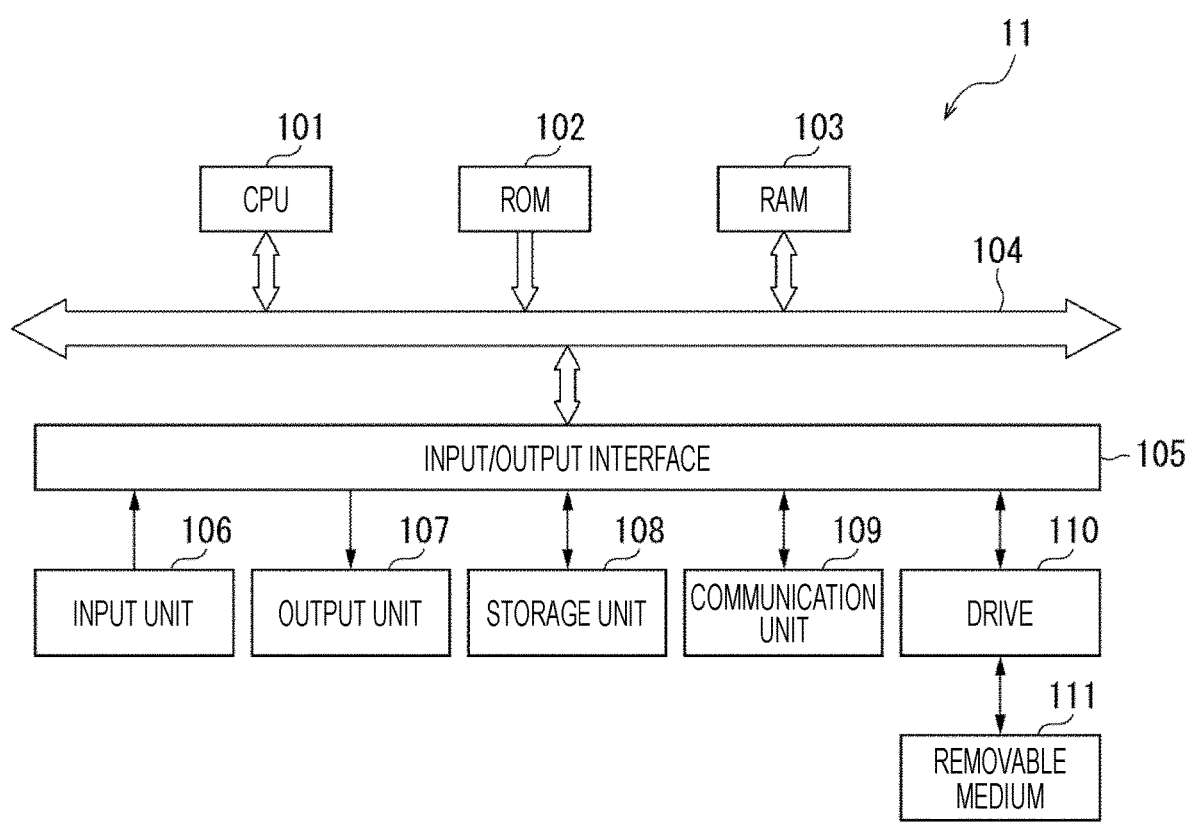
FIG. 2 is a block diagram showing a configuration example of an information processing device.

FIG. 2 is a block diagram showing a configuration example of the information processing device 11.

The information processing device 11 includes a central processing unit (CPU) 101, a read only memory (ROM) 102, a random access memory (RAM) 103, a bus 104, an input/output interface 105, an input unit 106, an output unit 107, a storage unit 108, a communication unit 109, and a drive 110. The CPU 101, the ROM 102, and the RAM 103 are mutually connected by the bus 104. The input/output interface 105 is also connected to the bus 104. The input unit 106, the output unit 107, the storage unit 108, the communication unit 109, and the drive 110 are connected to the input/output interface 105.

The input unit 106 includes, for example, an input switch, a button, a microphone, a camera, and the like.

The output unit 107 includes, for example, a display, a speaker, and the like. Note that each of the display device 12, the audio output device 13, and the vibration presenting device 14 of FIG. 1 can be provided in the output unit 107 as a part of the information processing device 11, for example.

The storage unit 108 includes, for example, a hard disk, a non-volatile memory, and the like.

The communication unit 109 includes, for example, a network interface and the like. The communication unit 109 communicates with the display device 12, the audio output device 13, and the vibration presenting device 14. Note that any method can be used as the communication method of the communication unit 109. For example, the communication method of the communication unit 109 may be either wired communication or wireless communication, and the communication unit 109 may support multiple communication methods.

The drive 110 drives a removable medium 111 such as a magnetic disk, an optical disk, a magneto-optical disk, or a semiconductor memory.

Note that hereinafter, in the information processing device 11, the description of the bus 104 and the input/output interface 105 will be omitted as appropriate. For example, when the CPU 101 and the communication unit 109 exchange data through the bus 104 and the input/output interface 105, it is described simply that the CPU 101 and the communication unit 109 exchange data.

<Configuration Example of Information Processing Unit 151>

Figure 3:
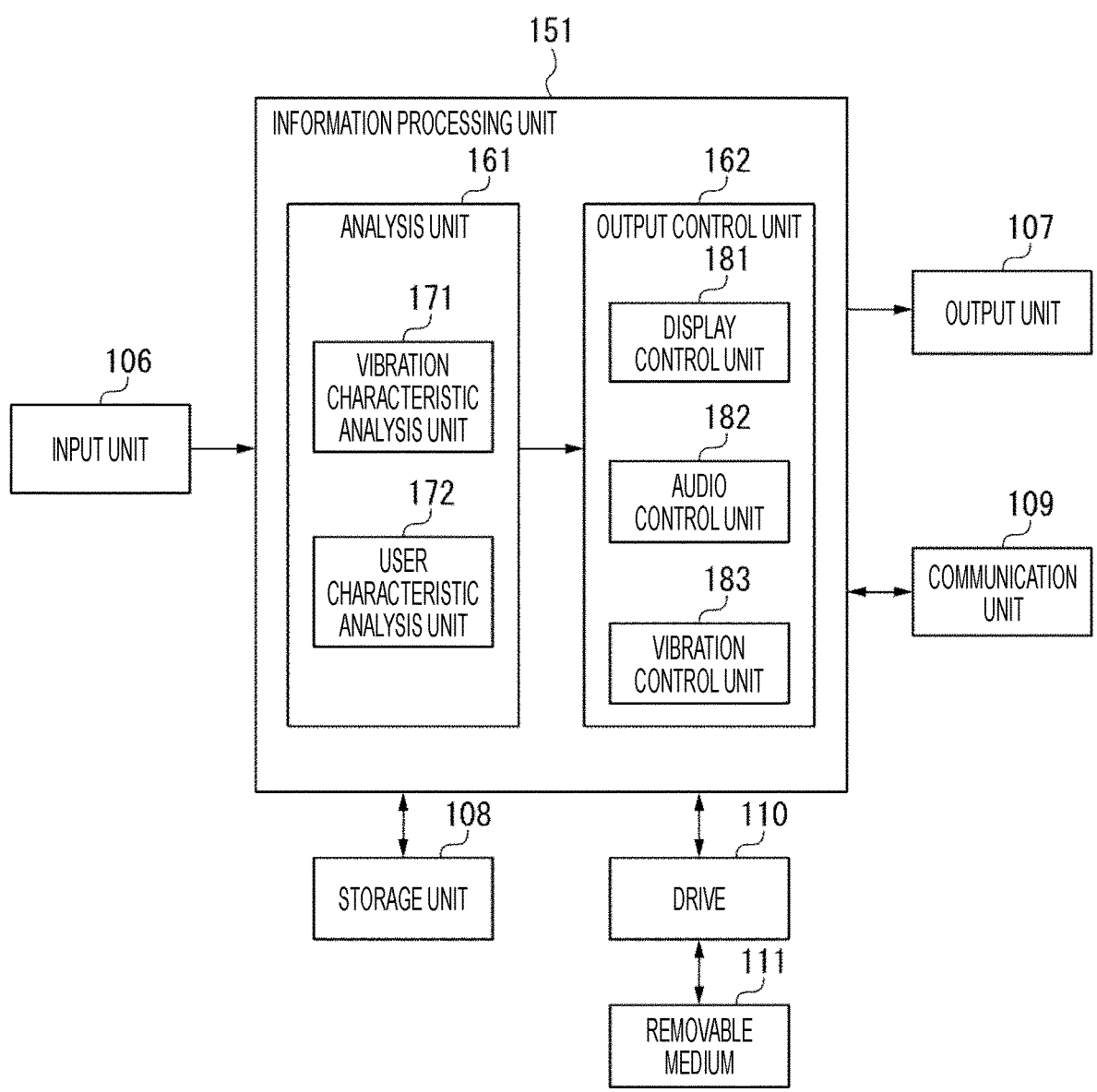
FIG. 3 is a block diagram showing a configuration example of an information processing unit.

FIG. 3 is a block diagram showing a configuration example of an information processing unit 151 implemented by the CPU 101 of the information processing device 11 executing a predetermined control program. Note that in FIG. 3, the ROM 102, the RAM 103, the bus 104, and the input/output interface 105 are not shown.

The information processing unit 151 includes an analysis unit 161 and an output control unit 162.

The analysis unit 161 analyzes a vibration characteristic of the vibration presenting device 14 and a user characteristic of the user who uses the information processing system 10. The analysis unit 161 includes a vibration characteristic analysis unit 171 and a user characteristic analysis unit 172.

The vibration characteristic analysis unit 171 analyzes the vibration characteristic of the vibration presenting device 14 on the basis of sensor data and the like supplied from the vibration presenting device 14.

The user characteristic analysis unit 172 analyzes the user characteristic on the basis of input data supplied from the input unit 106, sensor data supplied from the vibration presenting device 14, and the like. For example, the user characteristic analysis unit 172 estimates or detects a load applied to multiple vibration presenting units included in the vibration presenting device 14 by the user.

The output control unit 162 controls output of the content and the vibration corresponding to the content. The output control unit 162 includes a display control unit 181, an audio control unit 182, and a vibration control unit 183.

The display control unit 181 controls the display of video by the display device 12. For example, the display control unit 181 extracts video data from content data given from the outside, and performs processing, correction, and the like on the video data as necessary. Additionally, for example, the display control unit 181 supplies video data to the display device 12 through the communication unit 109, in synchronization with the audio control unit 182 and the vibration control unit 183, and causes the display device 12 to display video based on the video data.

The audio control unit 182 controls the output of audio by the audio output device 13. For example, the audio control unit 182 extracts audio data from content data given from the outside, and performs processing, correction, and the like on the audio data as necessary. Additionally, for example, the audio control unit 182 supplies audio data to the audio output device 13 through the communication unit 109, in synchronization with the display control unit 181 and the vibration control unit 183, and causes the audio output device 13 to output audio based on the audio data.

The vibration control unit 183 individually controls vibration presented in association with the content by each vibration presenting unit included in the vibration presenting device 14 on the basis of the characteristic of the user and the positions of the multiple vibration presenting units. For example, the vibration control unit 183 generates vibration control data on the basis of vibration data and a tactile information database given from the outside. Note that details of vibration data and tactile information database will be described later. The vibration control unit 183 supplies vibration control data to the vibration presenting device 14 through the communication unit 109, in synchronization with the display control unit 181 and the audio control unit 182, and causes the vibration presenting device 14 to present vibration based on the vibration control data.

Note that content data and vibration data may be given to the information processing unit 151 by storing them in the storage unit 108 or the removable medium 111, or may be given to the information processing unit 151 from an external server or the like through the communication unit 109. Similarly, the tactile information database may be given to the information processing unit 151 by storing it in the storage unit 108 or the removable medium 111, or may be given to the information processing unit 151 from an external server or the like through the communication unit 109.

Additionally, vibration data may be included in content data, or may be provided separately from content data, for example.

Note that an example in which vibration data is provided separately from content data will be described below. Additionally, an example in which content data and vibration data are stored in the removable medium 111 and the tactile information database is stored in the storage unit 108 will be described below.

<Configuration example of vibration presenting device 14>

Figure 4:
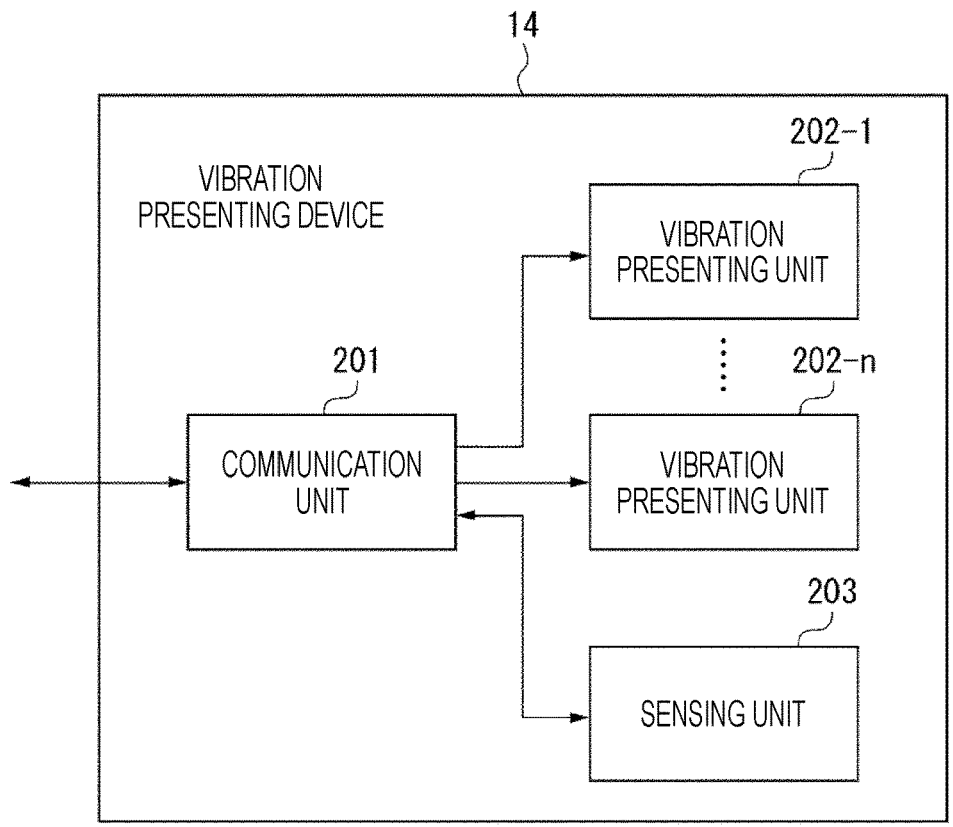
FIG. 4 is a block diagram showing a configuration example of a vibration presenting device.

FIG. 4 is a block diagram showing a functional configuration example of the vibration presenting device 14 of FIG. 1.

The vibration presenting device 14 includes a communication unit 201, vibration presenting units 202-1 to 202-*n*, and a sensing unit 203.

The communication unit 201 includes, for example, a network interface and the like. The communication unit 109 supports a similar communication method as the communication unit 109 of the information processing device 11 and communicates with the communication unit 109.

Each of the vibration presenting units 202-1 to 202-*n* individually presents vibration to the user on the basis of vibration control data supplied from the information processing device 11.

Note that hereinafter, when it is not necessary to distinguish the vibration presenting units 202-1 to 202-*n* individually, they are simply referred to as the vibration presenting unit 202.

The sensing unit 203 includes a sensor that detects data used for analyzing the vibration characteristic of the vibration presenting unit 202. For example, the sensing unit 203 includes a pressure sensor, a gravity sensor, an acceleration sensor, and the like. The sensing unit 203 transmits sensor data indicating the detection result to the information processing device 11 through the communication unit 201.

<Specific Example of Vibration Presenting Device 14>

Figure 5:
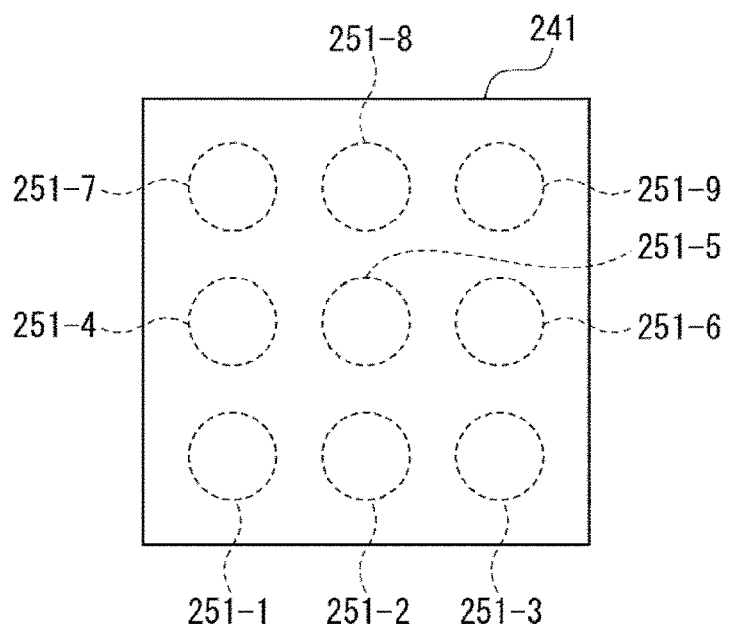
FIG. 5 is a block diagram showing a configuration example of a seat surface.

FIG. 5 is a schematic diagram showing a configuration example of a seat surface 241 which is a specific example of the vibration presenting device 14.

The seat surface 241 forms a part of a chair or is provided on a chair, for example.

Inside the seat surface 241, actuators 251-1 to 251-9 are arranged in 3 rows×3 columns. The actuators 251-1 to 251-9 correspond to the vibration presenting units 202-1 to 202-*n* of the vibration presenting device 14 of FIG. 4.

Note that in FIG. 5, the lower side is the front side of the seat surface 241 and the upper side is the rear side of the seat surface 241. Accordingly, the actuators 251-1 to 251-3 are in the first row, and the actuators 251-7 to 251-9 are in the last row. Additionally, the actuator 251-1, the actuator 251-4, and the actuator 251-7 are in the rightmost column, and the actuator 251-3, the actuator 251-6, and the actuator 251-9 are in the leftmost column.

Note that hereinafter, a case where the seat surface 241 is used as the vibration presenting device 14 will be described as an example. Additionally, hereinafter, when it is not necessary to distinguish the actuators 251-1 to 251-9 individually, they are simply referred to as the actuator 251.

<Processing of Information Processing System 10>

Next, processing of the information processing system 10 will be described with reference to FIGS. 6 to 12.

<Vibration Characteristic Analysis Processing>

First, vibration characteristic analysis processing performed by the information processing system 10 will be described with reference to the flowchart of FIG. 6.

In step S1, the information processing system 10 measures a vibration characteristic of the actuator 251.

Here, the vibration characteristic of the actuator 251 is a frequency characteristic represented by the amplitude and frequency of vibration generated by the actuator 251. Then, the vibration characteristic of the actuator 251 changes depending on the load (pressure) applied to the actuator 251.

Figure 7:
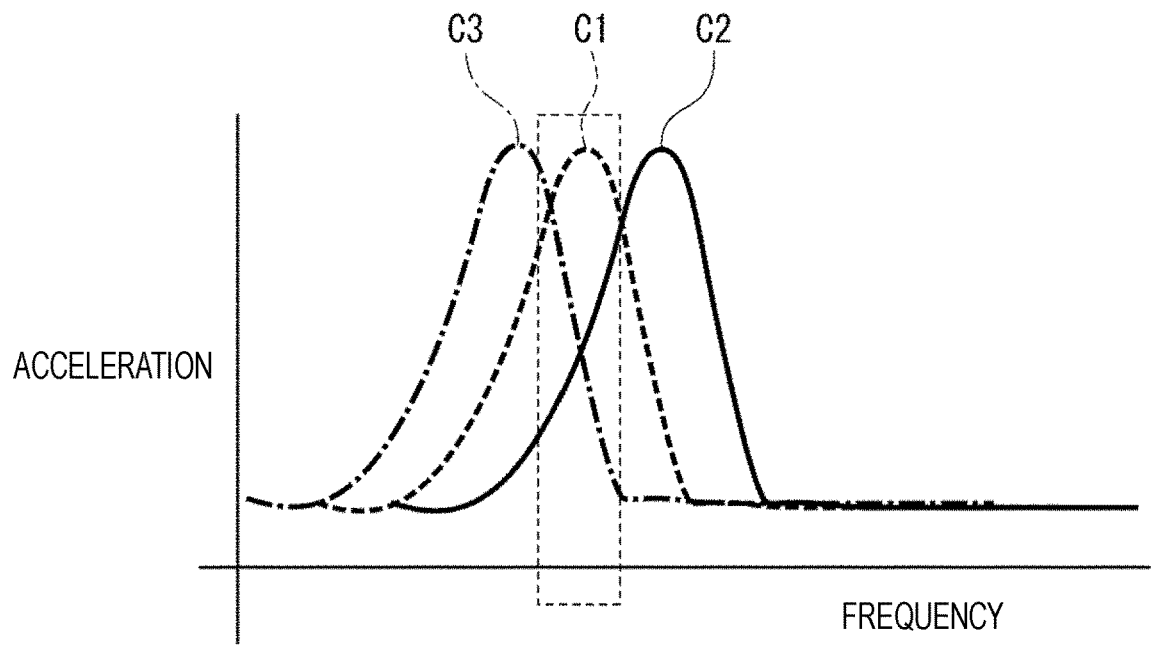
FIG. 7 is a graph showing an example of the vibration characteristic of an actuator.

For example, FIG. 7 is a graph showing an example of change in the vibration characteristic of the actuator 251 caused by a load. The horizontal axis shows the frequency of vibration, and the vertical axis shows the acceleration of vibration.

For example, assume that the vibration characteristic of the actuator 251 when predetermined input data is input in a case where a person of a predetermined weight (hereinafter referred to as standard weight) is sitting on the seat surface 241 is designed as shown by curve C1.

In this case, for example, when a person lighter than the standard weight sits on the seat surface 241, the load on the actuator 251 is reduced. As a result, the vibration characteristic of the actuator 251 changes as shown by curve C2. That is, the frequency at which the acceleration of vibration is maximized (resonance point) moves to the high frequency side.

On the other hand, for example, when a person heavier than the standard weight sits on the seat surface 241, the load on the actuator 251 is increased. As a result, the vibration characteristic of the actuator 251 changes as shown by curve C3. That is, the resonance point of vibration moves to the low frequency side.

Hence, for example, the vibration characteristic analysis unit 171 measures the resonance point of vibration generated by the actuator 251 while varying the load of the actuator 251 in a state where predetermined input data is input to the actuator 251 on the basis of sensor data from the sensing unit 203 of the seat surface 241.

In step S2, the information processing system 10 generates vibration characteristic data.

For example, the vibration characteristic analysis unit 171 classifies the vibration characteristic of the actuator 251 into multiple patterns on the basis of the measurement result in step S. For example, the vibration characteristic analysis unit 171 classifies the vibration characteristic of the actuator 251 into multiple patterns on the basis of the measurement result of the resonance point of vibration generated by the actuator 251. Then, the vibration characteristic analysis unit 171 generates vibration characteristic data showing the classification result of the vibration characteristic pattern of the actuator 251.

Figures 8, 9:
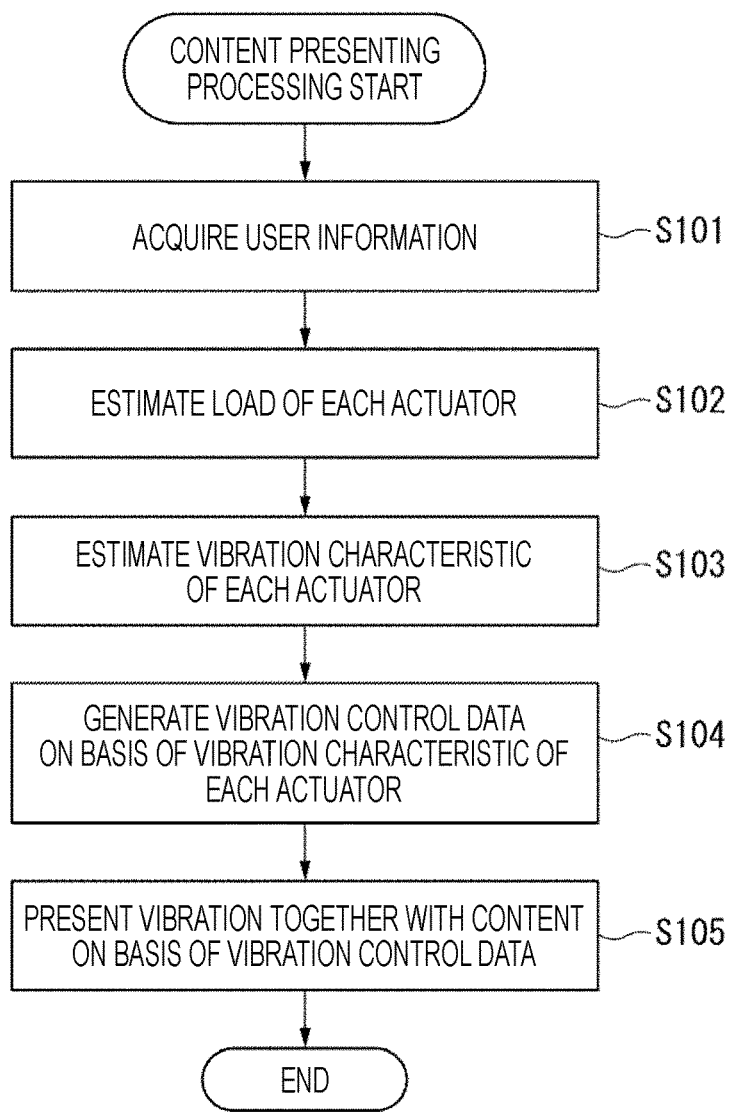
FIG. 8 is a diagram showing an example of vibration characteristic data.
FIG. 9 is a flowchart for describing a first embodiment of content presenting processing.

FIG. 8 shows an example of vibration characteristic data. In this example, the vibration characteristic of the actuator 251 is classified into multiple patterns depending on the load of the actuator 251. For example, the vibration characteristic of the actuator 251 is classified into pattern A when the load (pressure) is in the range of 1 to 10 pascals. That is, when the load is in the range of 1 to 10 pascals, the resonance points of vibration generated by the actuator 251 are generally similar. Additionally, for example, the vibration characteristic of the actuator 251 is classified into pattern B when the load is in the range of 10 to 11 pascals. That is, when the load is in the range of 10 to 11 pascals, the resonance points of vibration generated by the actuator 251 are generally similar. In the range of other loads (not shown), too, the vibration characteristic pattern of the actuator 251 is classified on the basis of the load of the actuator 251.

The vibration characteristic analysis unit 171 stores the vibration characteristic data in the storage unit 108.

Note that in a case where the characteristics of the actuators 251 are similar, vibration characteristic data common to the actuators 251 is generated, for example. On the other hand, in a case where the characteristics of the actuators 251 are different, vibration characteristic data is generated for each actuator 251, for example. Note that in the following, a case where the characteristics of the actuators 251 are similar will be described.

Thereafter, the vibration characteristic analysis processing is completed.

Note that while the above description describes an example in which the vibration characteristic analysis unit 171 generates vibration characteristic data, the user can generate vibration characteristic data on the basis of the measurement result of the vibration characteristic of the actuator 251, for example.

<Content Presenting Processing>

Next, content presenting processing performed by the information processing system will be described with reference to the flowchart of FIG. 9.

In step S101, the user characteristic analysis unit 172 acquires user information. User information is input by the input unit 106 and supplied to the user characteristic analysis unit 172, for example.

User information includes, for example, information related to physical characteristics of the user. Information related to physical characteristics of the user may be, for example, information that directly represents physical characteristics such as height, weight, and image, or may be information that can be used for estimating physical characteristics such as gender and age. Additionally, the user's image may be of any type as long as it is an image that shows physical characteristics of the user, such as a color image, an infrared image, and a 3D image.

In step S102, the user characteristic analysis unit 172 estimates the load of each actuator 251.

Figure 10:
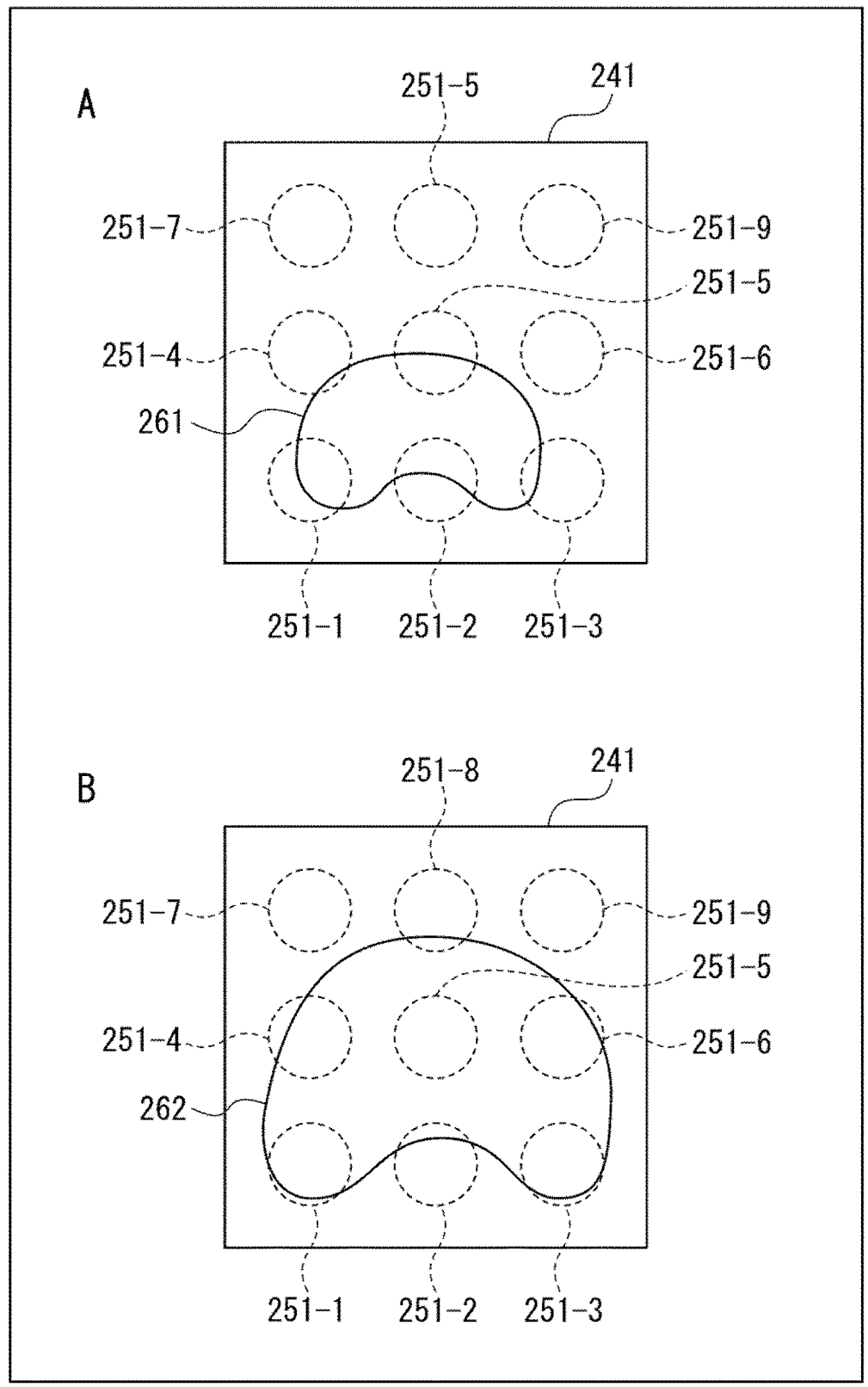
FIG. 10 is a diagram showing examples of a position where a user sits on a seat surface.

A and B of FIG. 10 show examples of a position where the user sits on the seat surface 241. A of FIG. 10 shows an example where the user is a child, and B of FIG. 10 shows an example where the user is an adult.

In a case where the user is a child, he or she tends to sit at the front of the seat surface 241 since his or her body is small. Accordingly, the position where the user's body touches the seat surface 241 is in a range 261 at the front of the seat surface 241. For this reason, almost no weight is applied to the actuators 251-7 to 251-9 at the back of the seat surface 241.

On the other hand, in a case where the user is an adult, the position where the user's body touches the seat surface 241 is in a range 262 larger than the range 261. Accordingly, the weight of the user is applied to the entire seat surface 241. Note, however, that the weight of the user is not evenly applied to the actuators 251, and varies depending on the position of the actuator 251.

Hence, for example, the user characteristic analysis unit 172 estimates the position where the user sits on the seat surface 241 and the distribution of the user's weight on the seat surface 241 on the basis of the acquired user information. Then, the user characteristic analysis unit 172 estimates the load of each actuator 251 on the basis of the distribution of the user's weight on the seat surface 241.

Figure 11:
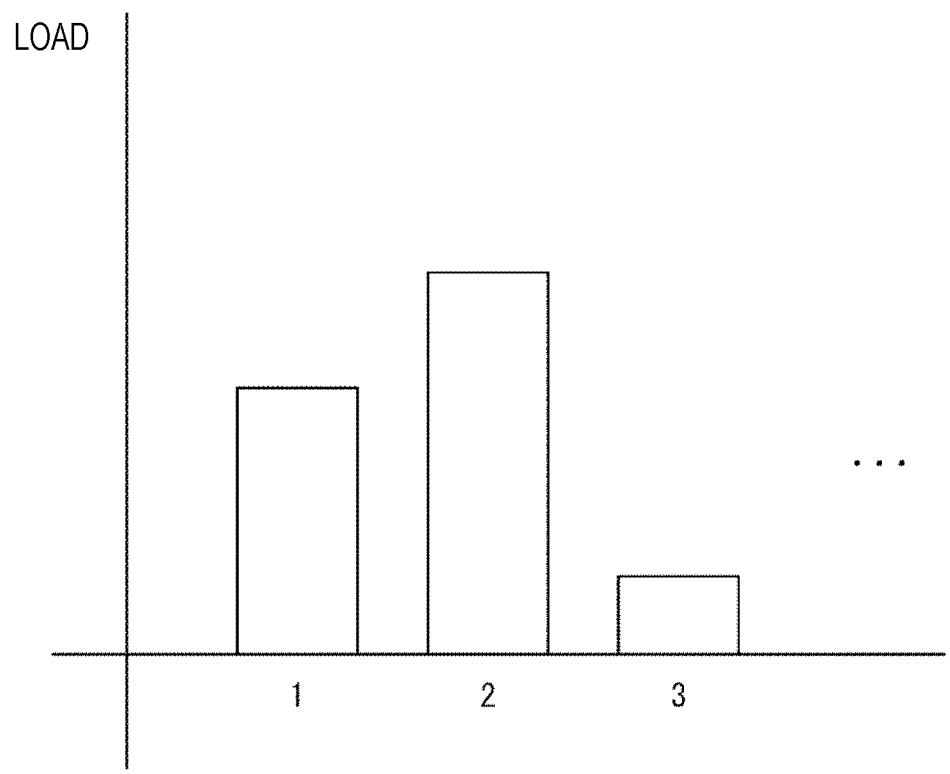
FIG. 11 is a graph showing the estimation result of the load of each actuator.

FIG. 11 is a graph showing the estimation result of the load of each actuator 251. The vertical axis shows the load (pressure), and each bar graph shows an estimated value of the load of each actuator 251.

In step S103, the user characteristic analysis unit 172 estimates the vibration characteristic of each actuator 251. Specifically, the user characteristic analysis unit 172 estimates the vibration characteristic pattern of each actuator 251 on the basis of the estimation result of the load of each actuator 251 and the vibration characteristic data stored in the storage unit 108. That is, the user characteristic analysis unit 172 obtains a vibration characteristic pattern corresponding to the estimated value of the load of each actuator 251 on the basis of the vibration characteristic data. The user characteristic analysis unit 172 generates a vibration characteristic map showing the vibration characteristic pattern of each actuator 251 and supplies it to the output control unit 162.

In step S104, the vibration control unit 183 generates vibration control data on the basis of the vibration characteristic of each actuator 251. Specifically, the vibration control unit 183 reads vibration data indicating the vibration to be presented together with the content from the removable medium 111 through the drive 110.

In the vibration data, for example, the type of vibration (hereinafter referred to as vibration pattern) to be presented for each scene of the content is shown. Note that an arbitrary method may be used for dividing the content into scenes. Additionally, for example, multiple vibration patterns may be presented in combination in one scene. Moreover, vibration is not always presented in all scenes, and there may be scenes in which vibration is not presented. Hereinafter, a scene in which vibration is presented is referred to as a vibration presenting scene.

Additionally, the vibration control unit 183 reads vibration pattern data corresponding to the vibration pattern of each scene on the basis of the vibration data, from the tactile information database stored in the storage unit 108.

Vibration pattern data corresponding to each vibration pattern is stored in the tactile information database. Vibration pattern data includes, for example, input data to be input to each actuator 251 in order to achieve vibration of the corresponding vibration pattern. Accordingly, by inputting each piece of input data included in the vibration pattern data to each actuator 251, the actuator 251 vibrates, and vibration corresponding to the corresponding vibration pattern is achieved.

Note that the input data of each actuator 251 included in the vibration pattern data is not always the same data. For example, in a case where different vibrations are applied to each part of the user's body, different data is used as the input data of each actuator 251.

Next, the vibration control unit 183 corrects the vibration pattern data of each scene on the basis of the vibration characteristic map, for example. For example, the vibration control unit 183 corrects the input data to each actuator 251 included in the vibration pattern data of each scene on the basis of the vibration characteristic pattern of each actuator 251.

For example, the input data to each actuator 251 is designed for a predetermined vibration characteristic pattern (hereinafter, referred to as basic vibration characteristic pattern). Accordingly, the vibration control unit 183 corrects input data to an actuator 251 whose vibration characteristic pattern is different from the basic vibration characteristic pattern, so that a vibration similar to that when the vibration characteristic pattern is the basic vibration characteristic pattern is output.

Figure 12:
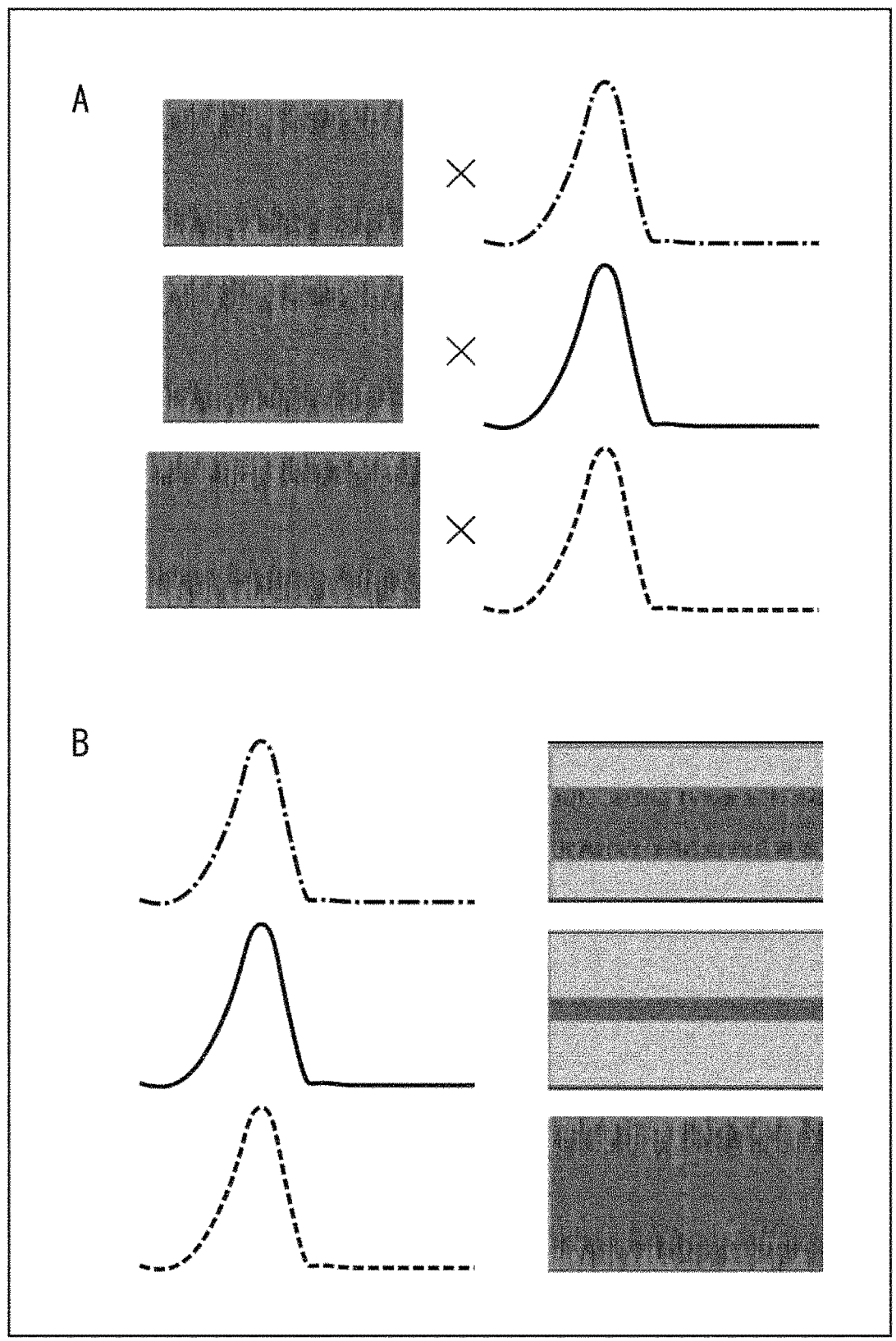
FIG. 12 is a diagram for describing a method of correcting or generating vibration pattern data.

For example, as schematically shown in A of FIG. 12, the amplitude and frequency of the waveform of the input data on the left side are corrected on the basis of the vibration characteristic pattern of the input destination actuator 251 on the right side. As a result, even if the vibration characteristic of each actuator 251 changes due to the load generated by the user, the vibration presented by each actuator 251 remains almost unchanged.

Note that multiple pieces of input data of each actuator 251 corresponding to each vibration pattern data may be prepared for each vibration characteristic pattern, for example. Then, for example, as shown schematically in B of FIG. 12, the vibration control unit 183 may read the input data corresponding to the vibration characteristic pattern of each actuator 251 from the tactile information database, and generate vibration pattern data on the basis of the read input data of each actuator 251.

Then, the vibration control unit 183 generates vibration control data including the vibration pattern data of each vibration presenting scene. As a result, vibration control data is generated before the content is presented.

In step S105, the information processing system 10 presents vibration together with the content on the basis of the vibration control data.

Specifically, the display control unit 181, the audio control unit 182, and the vibration control unit 183 perform the following processing in synchronization with each other.

The display control unit 181 reads video data included in content data of the content to be presented from the removable medium 111 through the drive 110, and supplies the video data to the display device 12 through the communication unit 109. The display device 12 displays video based on the video data.

The audio control unit 182 reads audio data included in content data of the content to be presented from the removable medium 111 through the drive 110, and supplies the audio data to the audio output device 13 through the communication unit 109. The audio output device 13 outputs audio based on the audio data.

The vibration control unit 183 supplies vibration control data to the seat surface 241 through the communication unit 109. Each actuator 251 of the seat surface 241 vibrates in each vibration presenting scene on the basis of the input data included in the vibration pattern data of the scene.

As a result, the vibration is presented to the user in association with the content.

Thereafter, the content presenting processing ends.

As described above, the vibration presented by each actuator 251 is corrected on the basis of the characteristic of the user and the position of each actuator 251, or more specifically, on the basis of the load applied to each actuator 251 by the user. That is, the vibration presented by each actuator 251 is corrected (controlled) on the basis of the change in the vibration characteristic caused by the load applied to each actuator 251 by the user. This reduces the individual difference of the presented vibration, and vibration close to the design value is presented to the user regardless of the difference in the user. As a result, the individual difference in the user experience due to vibration is reduced, and an appropriate effect can be given to the user.

Additionally, auto-resonance for detecting the resonance point of the actuator 251 is time-consuming processing. Also, it takes more time to execute auto-resonance for all the actuators 251.

On the other hand, by analyzing the vibration characteristic of the actuator 251 in advance and estimating the vibration characteristic of each actuator 251 on the basis of the vibration characteristic data showing the analysis result and the load of each actuator 251, the processing time is shortened.

2. Second Embodiment

Next, a second embodiment of the present technology will be described with reference to FIGS. 13 and 14.

The second embodiment is different from the first embodiment in the content presenting processing.

<Content Presenting Processing>

Here, the content presenting processing of the second embodiment will be described by comparing the flowchart of FIG. 13.

In step S151, user information is acquired as in the processing of step S101 of FIG. 9.

In step S152, a user characteristic analysis unit 172 estimates the load of each actuator 251 for each scene type.

Normally, the user changes his/her posture depending on the content while viewing the content.

For example, in a scene where a stimulus is given from the front such as being attacked by a zombie from the front or being shot, it is assumed that the user leans back and the center of gravity moves to the back. As a result, for example, it is assumed that the load is concentrated on a range 271 of A of FIG. 14, the load on the actuators 251 in the rear two rows increases, and the load on the actuators 251 in the front single row decreases.

Additionally, for example, in a scene where a stimulus is given from the left such as being attacked by a zombie from the left or a scene where the center of gravity is applied to the left such as curving sharply to the left, it is assumed that the user moves his or her body to the left and the center of gravity moves to the left. As a result, for example, it is assumed that the load is concentrated on a range 272 of B of FIG. 14, the load on the actuators 251 in the left two columns increases, and the load on the actuators 251 in the right single column decreases.

In this way, the distribution of the load of the actuator 251 changes as the user's posture changes depending on the content. Then, as the load of each actuator 251 changes, the vibration characteristic of each actuator 251 also changes.

Hence, the user characteristic analysis unit 172 assumes a general change in the posture of the user (movement of the user) for each scene type, and estimates the load of each actuator 251 on the basis of the assumed posture.

Note that an arbitrary method may be used for classifying the scene type. However, that it is desirable to classify the scene type on the basis of the tendency of the posture taken by the user. That is, it is desirable to classify the scene type so that there is a clear tendency of the posture taken by the user for each type of scene.

Specifically, the user characteristic analysis unit 172 estimates the load of each actuator 251 in the standard posture of the user by processing similar to that in step S101 of FIG. 9.

Additionally, the user characteristic analysis unit 172 estimates the load of each actuator 251 for each scene type on the basis of the user's posture assumed for each scene type by using the load of each actuator 251 in the standard posture as a reference.

Here, the posture of the user assumed for each scene type is intended for a general user, and is set in advance by an experiment, a simulation, or the like, for example. Note that users may be classified into multiple groups according to age, gender, and the like, and the posture of the user for each scene type may be estimated for each group, for example.

In step S153, the user characteristic analysis unit 172 estimates the vibration characteristic of each actuator 251 for each scene type. Specifically, the user characteristic analysis unit 172 generates a vibration characteristic map for each scene type by processing similar to that of step S103 of FIG. 9, on the basis of the load of each actuator 251 for each scene type.

In step S154, the user characteristic analysis unit 172 generates vibration control data based on the basis of the vibration characteristic of each actuator 251 for each scene type. Specifically, the user characteristic analysis unit 172 generates vibration control data by processing similar to that of step S104 of FIG. 9. Note, however, that the user characteristic analysis unit 172 corrects or generates vibration pattern data of each vibration presenting scene using a vibration characteristic map corresponding to the scene type.

In step S155, as in the processing of step S105 of FIG. 9, vibration is presented together with the content on the basis of the vibration control data.

As described above, the load of each actuator 251 is estimated for each scene of the content, and the vibration presented by each actuator 251 is corrected on the basis of the estimated load. More specifically, the load of each actuator 251 is estimated on the basis of the posture of the user assumed for each scene type, and the vibration presented by each actuator 251 is corrected on the basis of the estimated load. This reduces the individual difference in the presented vibration even more, and vibration close to the design value is presented to the user regardless of the difference in the user or the posture. As a result, the individual difference in the user experience due to vibration is further reduced, and a more appropriate effect can be given to the user.

3. Third Embodiment

Next, a third embodiment of the present technology will be described with reference to FIG. 15.

The third embodiment is different from the first and second embodiments in the content presenting processing.

<Content Presenting Processing>

Here, the content presenting processing of the third embodiment will be described with reference to the flowchart of FIG. 15.

In step S201, an information processing device 11 detects the load of each actuator 251. For example, a user viewing the content sits on a seat surface 241 and takes a natural posture. In this state, a user characteristic analysis unit 172 detects the load of each actuator 251 on the basis of sensor data from a sensing unit 203 of the seat surface 241.

Thereafter, in steps S202 to S204, processing similar to that in steps S103 to S105 of FIG. 9 is performed, and the content presenting processing ends.

As described above, the load applied to each actuator 251 by a user actually viewing the content is detected, and the vibration presented by each actuator 251 is corrected on the basis of the result. This reduces the individual difference in the presented vibration even more.

4. Fourth Embodiment

Next, a fourth embodiment of the present technology will be described with reference to FIGS. 16 and 17.

The fourth embodiment is different from the first to third embodiments in the content presenting processing.

<Content Presenting Processing>

Here, the content presenting processing of the fourth embodiment will be described with reference to the flowchart of FIG. 16.

In step S251, an information processing device 11 detects the load of each actuator 251 for each posture of the user.

Figure 15:
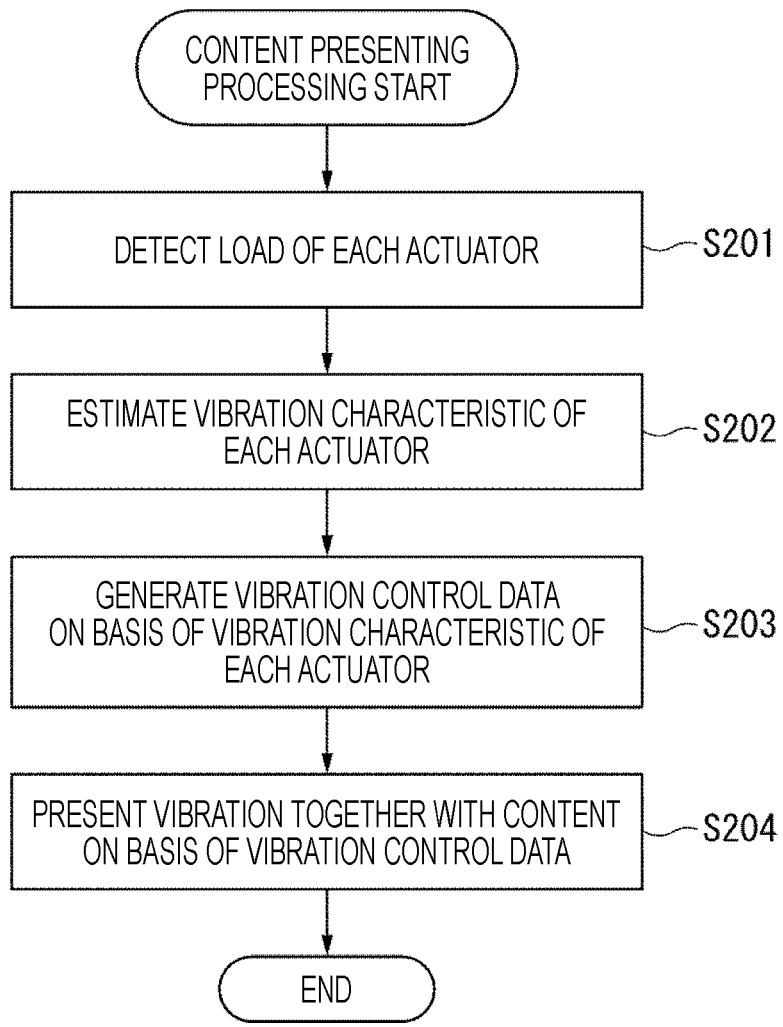
FIG. 15 is a flowchart for describing a third embodiment of the content presenting processing.

For example, first, by processing similar to that in step S201 of FIG. 15, the load of each actuator 251 is detected in a state where the user viewing the content sits on a seat surface 241 in a natural posture.

Next, for example, an information processing system 10 gives guidance to the user and asks the user to take various postures while sitting on the seat surface 241.

For example, a display device 12 displays a guidance screen as shown in A to C of FIG. 17 under the control of a display control unit 181 through a communication unit 109, and asks the user to take various postures. A of FIG. 17 is an example of a guidance screen giving an instruction to shift the user's weight backward. B of FIG. 17 is an example of a guidance screen giving an instruction to lean fully against the back of the chair provided with the seat surface 241. C of FIG. 17 is an example of a guidance screen giving an instruction to place both hands on the table in front of the chair provided with the seat surface 241.

A user characteristic analysis unit 172 detects the load of each actuator 251 on the basis of sensor data from a sensing unit 203 of the seat surface 241 in each posture.

In step S252, the user characteristic analysis unit 172 estimates the vibration characteristic of each actuator 251 for each posture of the user. That is, the user characteristic analysis unit 172 generates a vibration characteristic map for each posture of the user by processing similar to that in step S103 of FIG. 9 on the basis of the detected value of the load of each actuator 251 in each posture.

In step S253, the user characteristic analysis unit 172 generates vibration control data on the basis of the vibration characteristic of each actuator 251 for each posture of the user. Specifically, the user characteristic analysis unit 172 generates vibration control data by processing similar to that of step S104 of FIG. 9. Note, however, that the user characteristic analysis unit 172 corrects or generates vibration pattern data for each vibration presenting scene by using the vibration characteristic map corresponding to the posture of the user assumed in the scene type.

In step S254, as in the processing of step S105 of FIG. 9, vibration is presented together with the content on the basis of the vibration control data.

As described above, the load applied to each actuator 251 is detected for each posture of a user actually viewing the content, and vibration presented by each actuator 251 is corrected on the basis of the result. This further reduces the difference in the presented vibration due to the difference in the user and the posture.

5. Fifth Embodiment

Figure 18:
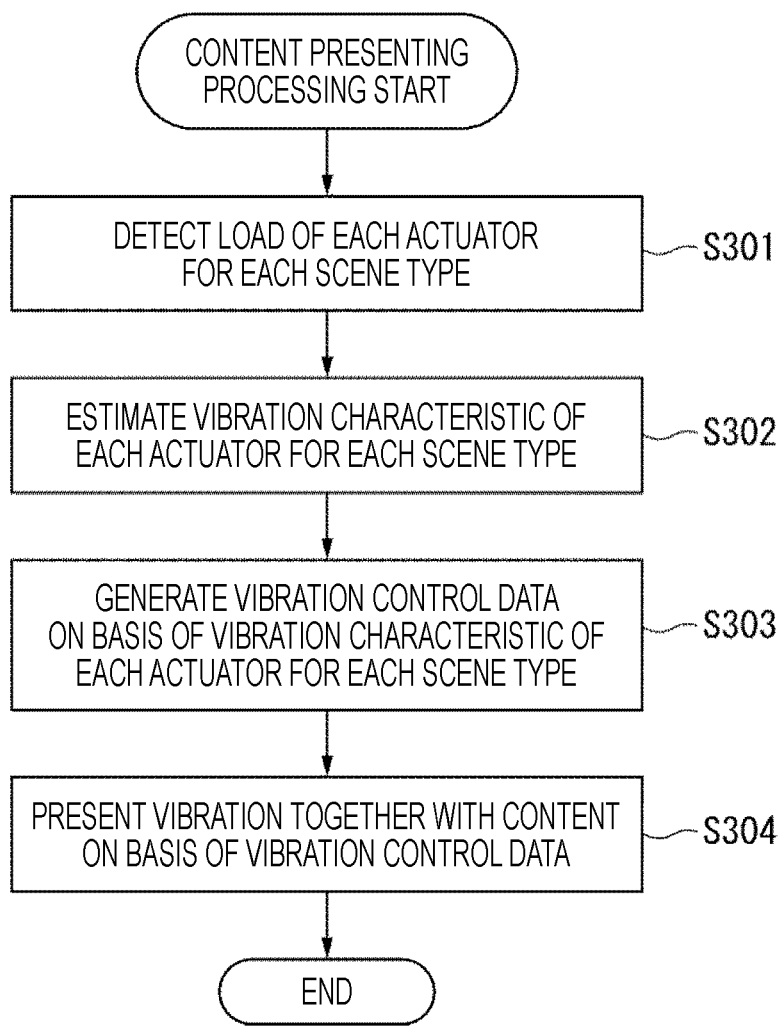
FIG. 18 is a flowchart for describing a fifth embodiment of the content presenting processing.

Next, a fifth embodiment of the present technology will be described with reference to FIG. 18.

The fifth embodiment is different from the first to fourth embodiments in the content presenting processing.

<Content Presenting Processing>

Here, the content presenting processing of the fifth embodiment will be described with reference to the flowchart of FIG. 18.

In step S301, an information processing device 11 detects the load of each actuator 251 for each scene type.

For example, a storage unit 108 of the information processing device 11 stores content data for presenting calibration content. Calibration content is, for example, content including sample video and sample audio of each type of scene.

Then, a display device 12 displays the video of the calibration content under the control of a display control unit 181 through a communication unit 109. An audio output device 13 outputs the audio of the calibration content under the control of an audio control unit 182 through the communication unit 109.

A user characteristic analysis unit 172 detects the load applied to each actuator 251 by the user when each type of scene is presented, on the basis of sensor data from a sensing unit 203 of a seat surface 241. That is, the user characteristic analysis unit 172 detects the load of each actuator 251 for each scene type.

Figure 13:
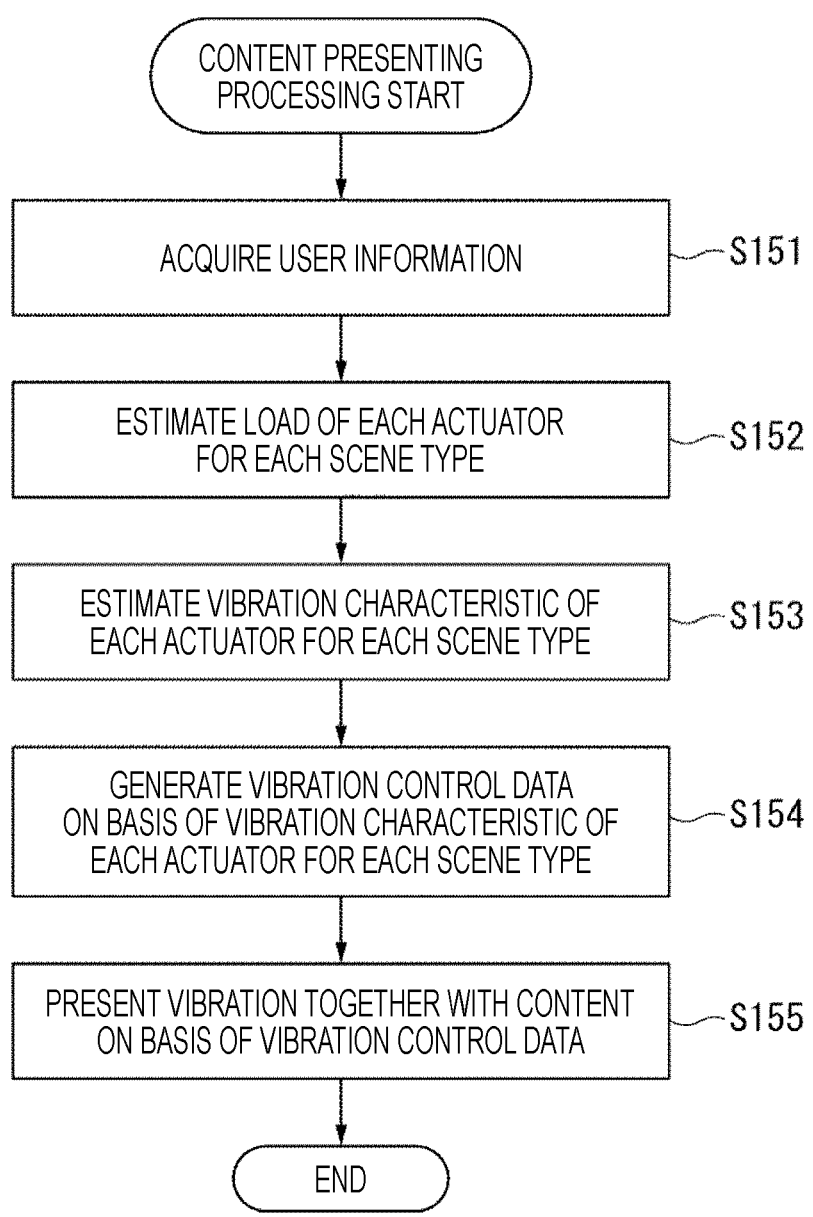
FIG. 13 is a flowchart for describing a second embodiment of the content presenting processing.
Figure 14:
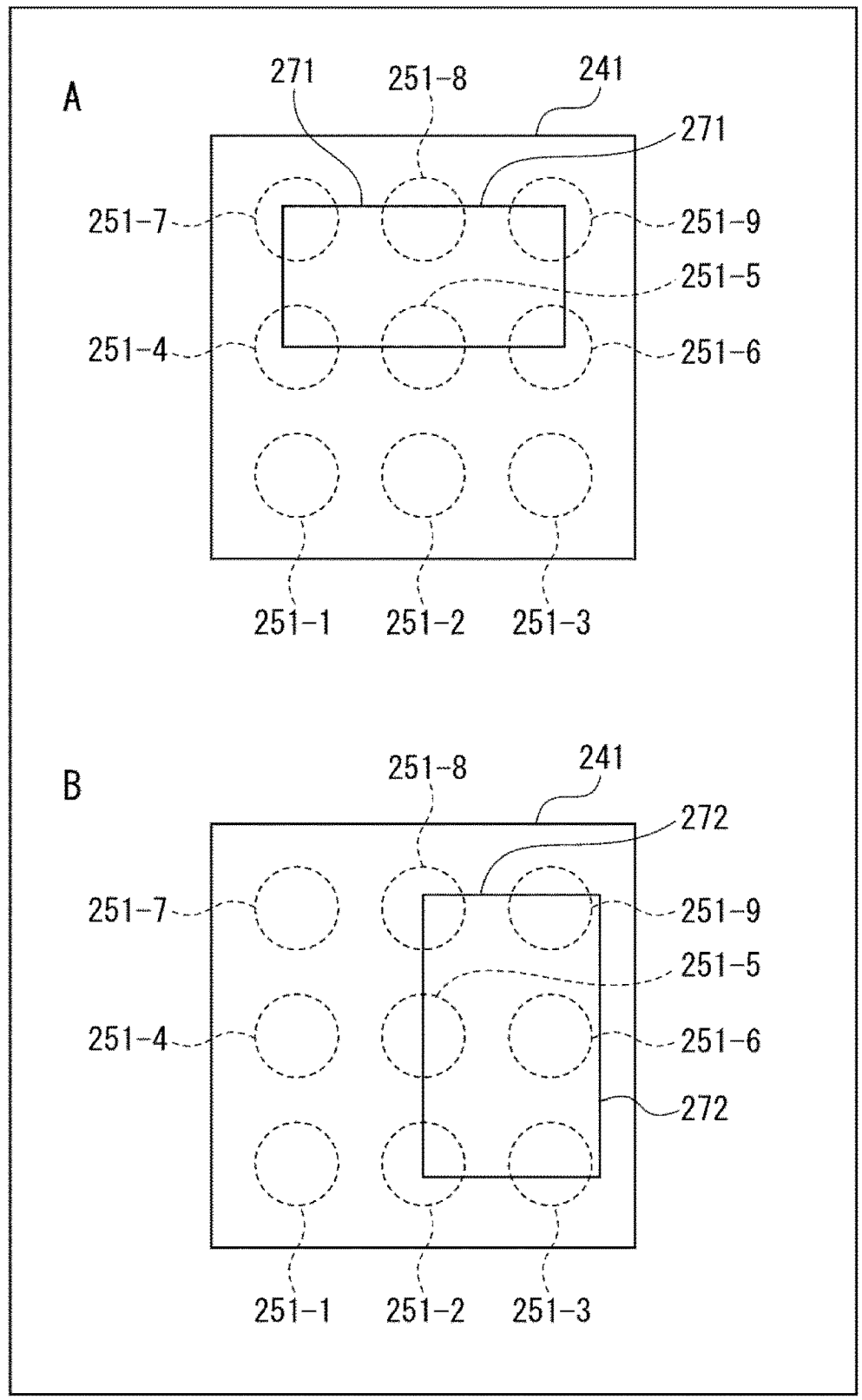
FIG. 14 is a diagram showing an example of a change in load due to a change in the posture of the user.

Thereafter, in steps S302 to S304, processing similar to that in steps S153 to S155 of FIG. 13 is performed.

As described above, the load applied to each actuator 251 when the user actually viewing the content views each type of scene is detected, and the vibration presented by each actuator 251 is corrected on the basis of the result. This further reduces the difference in the presented vibration due to the difference in the user and the scene.

6. Sixth Embodiment

Next, a sixth embodiment of the present technology will be described with reference to FIG. 19.

The sixth embodiment is different from the first to fifth embodiments in the content presenting processing.

<Content Presenting Processing>

Here, the content presenting processing of the sixth embodiment will be described with reference to the flowchart of FIG. 19.

Figure 16:
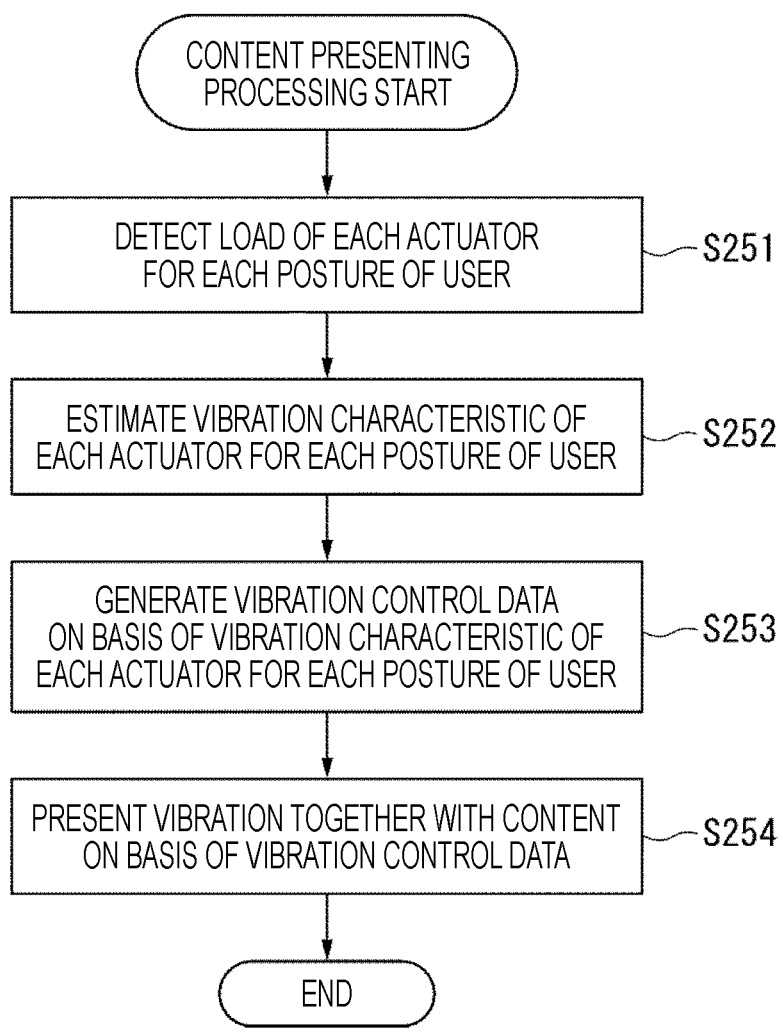
FIG. 16 is a flowchart for describing a fourth embodiment of the content presenting processing.

In step S351, as in the processing of step S251 of FIG. 16, the load of each actuator 251 is detected for each posture of the user.

In step S352, as in the processing of step S252 of FIG. 16, the vibration characteristic of each actuator 251 is estimated for each posture of the user.

In step S353, an information processing system 10 starts presenting the content.

Specifically, a display control unit 181, an audio control unit 182, and a vibration control unit 183 start the following processing in synchronization with each other.

The display control unit 181 reads video data included in content data to be presented from a removable medium 111 through a drive 110, and starts processing of supplying the video data to a display device 12 through a communication unit 109. The display device 12 starts displaying video based on the video data.

The audio control unit 182 reads audio data included in content data to be presented from the removable medium 111 through the drive 110, and starts processing of supplying the audio data to an audio output device 13 through the communication unit 109. The audio output device 13 starts outputting audio based on the audio data.

The vibration control unit 183 starts processing of reading vibration data indicating vibration to be presented in association with the content from the removable medium 111 through the drive 110.

In step S354, the vibration control unit 183 determines whether it is the timing to present vibration on the basis of the vibration data. If it is determined that it is the timing to present the vibration, the processing proceeds to step S355.

In step S355, the vibration control unit 183 estimates the posture of the user in the next vibration presenting scene.

For example, the vibration control unit 183 estimates the posture of the user on the basis of the type of the next vibration presenting scene.

For example, if the next vibration presenting scene is a scene of a type that has not been presented before, the vibration control unit 183 estimates that a posture assumed beforehand that the user will take for that type of vibration presenting scene is the posture of the user in the next vibration presenting scene.

On the other hand, if the next vibration presenting scene is a scene of a type that has been displayed before, the vibration control unit 183 estimates the posture of the user in the next vibration presenting scene on the basis of the history of postures taken by the user in the past in that type of scene. As a result, it is possible to accurately estimate the user's posture even when the user takes a posture different from the assumed posture.

In step S356, the vibration control unit 183 generates vibration control data on the basis of the estimated posture. Specifically, the vibration control unit 183 corrects or generates vibration pattern data of the next vibration presenting scene by processing similar to that in step S104 of FIG. 9 on the basis of the vibration characteristic map corresponding to the estimated posture. The vibration control unit 183 generates vibration control data including the corrected or generated vibration pattern data. That is, in this embodiment, vibration control data is dynamically generated during the presentation of the content.

In step S357, the information processing system 10 presents vibration on the basis of the vibration control data. Specifically, in the next vibration presenting scene, the vibration control unit 183 supplies the vibration control data to a seat surface 241 through a communication unit 109 in synchronization with the display control unit 181 and the audio control unit 182. Each actuator 251 of the seat surface 241 presents vibration on the basis of each piece of input data in vibration pattern data included in the vibration control data.

As a result, vibration is presented together with video and audio in the vibration presenting scene.

Thereafter, the processing proceeds to step S358.

On the other hand, if it is determined in step S354 that it is not the timing to present the vibration, the processing of steps S355 to S357 is skipped, and the processing proceeds to step S358.

In step S358, an output control unit 162 determines whether or not the content has ended. If it is determined that the content has not ended yet, the processing returns to step S354.

Thereafter, in step S358, the processing of steps S354 to S358 is repeatedly performed until it is determined that the content has ended.

On the other hand, if it is determined in step S358 that the content has ended, the content presenting processing ends.

As described above, the load applied to each actuator 251 when the user actually viewing the content views each type of scene is detected, and the posture taken by the user is estimated in real time. On the basis of the result, the vibration presented by each actuator 251 is corrected. This further reduces the difference in the presented vibration due to the difference in the user and the scene.

7. Seventh Embodiment

Figure 20:
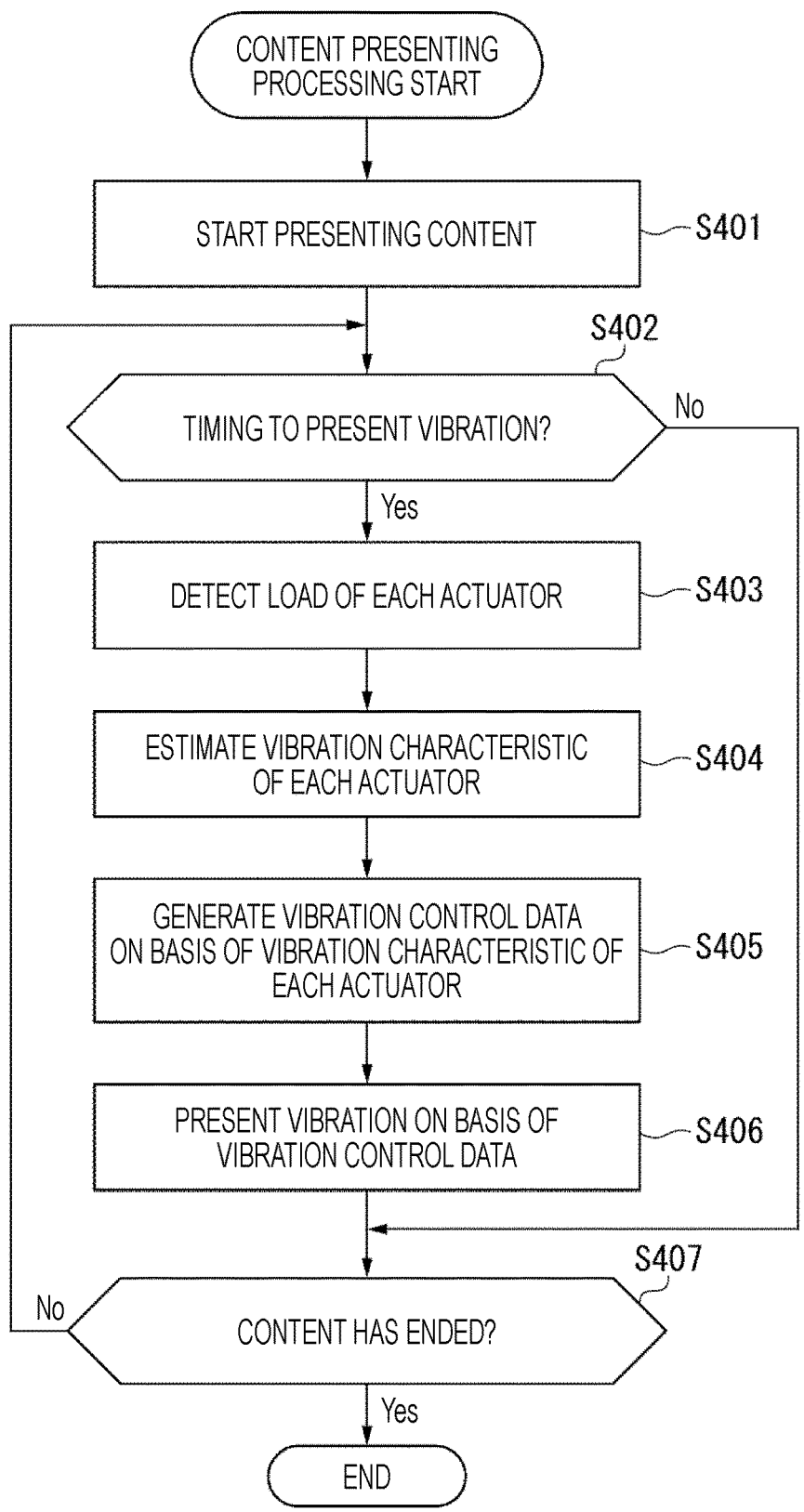
FIG. 20 is a flowchart for describing a seventh embodiment of the content presenting processing.

Next, a seventh embodiment of the present technology will be described with reference to FIG. 20.

The seventh embodiment is different from the first to sixth embodiments in the content presenting processing.

<Content Presenting Processing>

Here, the content presenting processing of the seventh embodiment will be described with reference to the flowchart of FIG. 20.

Figure 19:
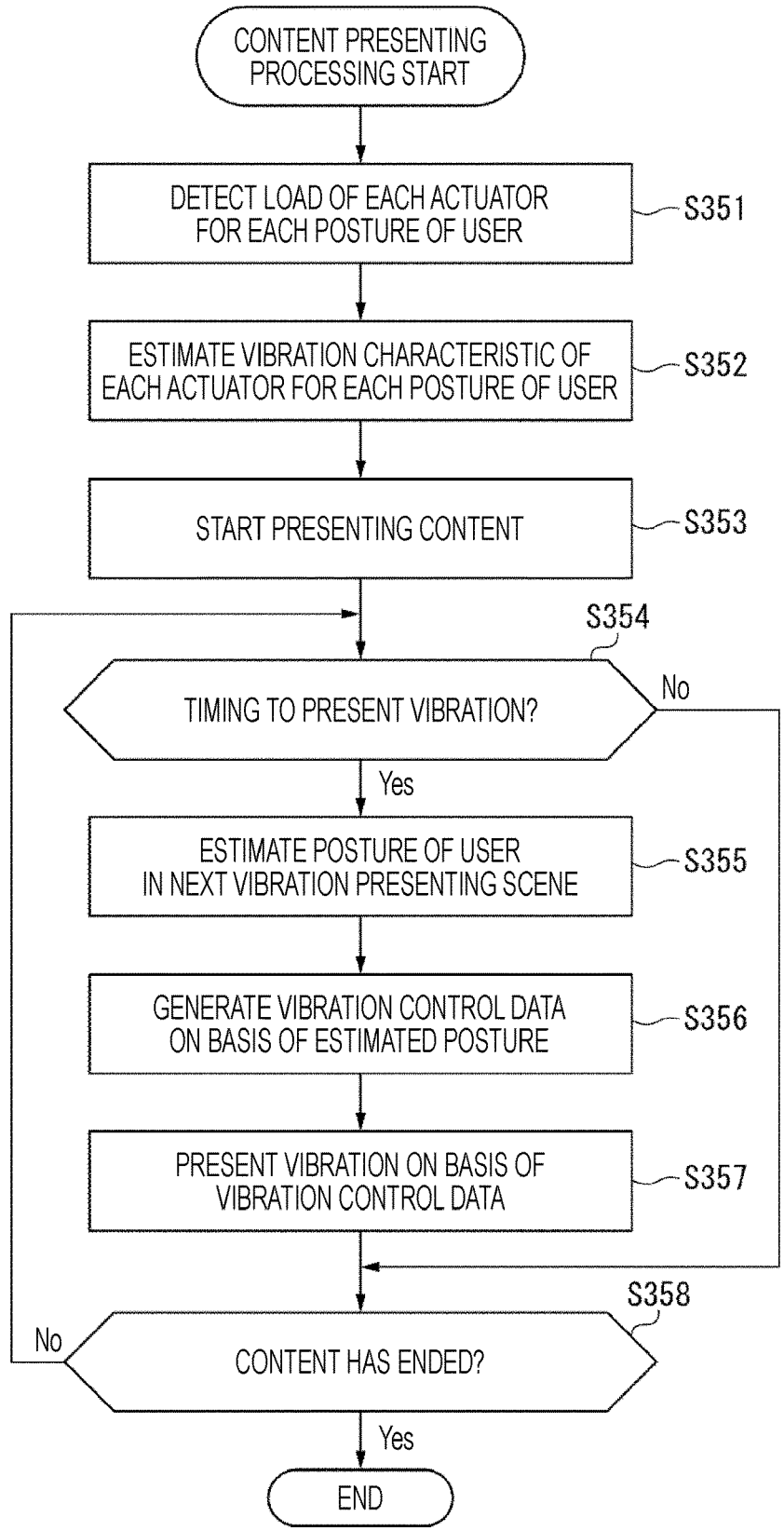
FIG. 19 is a flowchart for describing a sixth embodiment of the content presenting processing.

In step S401, as in the processing of step S353 of FIG. 19, the presentation of the content is started.

In step S402, as in the processing of step S354 of FIG. 19, it is determined whether or not it is the timing to present vibration. If it is determined that it is the timing to present the vibration, the processing proceeds to step S403.

In step S403, as in the processing of step S201 of FIG. 15, the load of each actuator 251 is detected.

In step S404, as in the processing of step S202 of FIG. 15, the vibration characteristic of each actuator 251 is estimated and a vibration characteristic map is generated.

In step S405, a vibration control unit 183 generates vibration control data on the basis of the vibration characteristic of each actuator 251. Specifically, the vibration control unit 183 corrects or generates vibration pattern data of the next vibration presenting scene by processing similar to that in step S104 of FIG. 9 on the basis of the generated vibration characteristic map. The vibration control unit 183 generates vibration control data including the corrected or generated vibration pattern data. That is, in this embodiment, vibration control data is dynamically generated during the presentation of the content.

In step S406, as in the processing of step S357 of FIG. 19, vibration is presented on the basis of the vibration control data.

Thereafter, the processing proceeds to step S407.

On the other hand, if it is determined in step S402 that it is not the timing to present the vibration, the processing of steps S403 to S406 is skipped, and the processing proceeds to step S407.

In step S407, as in the processing of step 3358 of FIG. 19, it is determined whether or not the content has ended. If it is determined that the content has not ended yet, the processing returns to step S402.

Thereafter, in step S407, the processing of steps S402 to S407 is repeatedly performed until it is determined that the content has ended.

On the other hand, if it is determined in step S407 that the content has ended, the content presenting processing ends.

As described above, the load of each actuator 251 is detected in real time, and the vibration presented by each actuator 251 is corrected on the basis of the detection result. This further reduces the difference in the presented vibration due to the difference in the user and the posture.

8. Modification

Hereinafter, modifications of the above-described embodiments of the present technology will be described.

For example, as shown in FIG. 21, the vibration characteristic pattern of the actuator 251 may be classified on the basis not only of the load but also of the resonance point. That is, the vibration characteristic pattern of the actuator 251 may be classified on the basis of a combination of the load and the resonance point.

In this case, for example, when the user is sitting on the seat surface 241, the resonance point is detected in addition to the load for each actuator 251. Then, the pattern of the vibration characteristic of each actuator 251 is estimated on the basis of the combination of the load and the resonance point. As a result, the vibration presented by each actuator 251 can be corrected on the basis of a more accurate vibration characteristic of each actuator 251.

Figure 6:
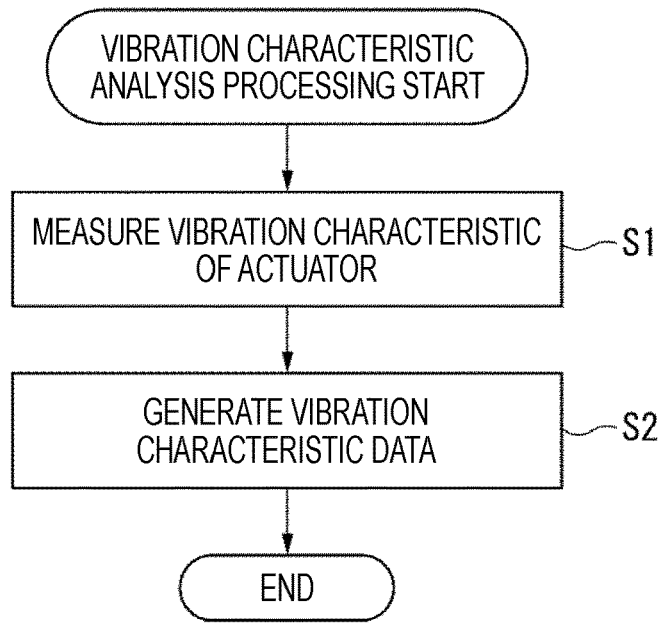
FIG. 6 is a flowchart for describing vibration characteristic analysis processing.

Additionally, for example, vibration characteristic data may be generated by performing the vibration characteristic analysis processing of FIG. 6 in a state where the user actually viewing the content is taking each posture.

In this case, for example, the vibration characteristic pattern is classified according to the posture of the user and the position of the actuator 251. For example, the vibration characteristic pattern in each posture of the actuators 251-1 to 251-9 is defined in the vibration characteristic data. Accordingly, the vibration characteristic pattern of each actuator 251 is specified by the posture of the user and the position of the actuator 251. As a result, the vibration presented by each actuator 251 can be corrected on the basis of a more accurate vibration characteristic of each actuator 251.

Moreover, for example, in the sixth embodiment of FIG. 19, the posture of the user may be detected on the basis of a captured image or the like of the user, and vibration control data may be generated on the basis of the detected posture.

Additionally, for example, the load of each actuator 251 may be detected by a method other than pressure. For example, input data of a sine wave may be input to each actuator 251 and the load of each actuator 251 may be detected on the basis of the acceleration of each actuator 251 in that state.

Moreover, for example, the vibration data may include input data of each actuator 251 in each vibration presenting scene. Then, for example, the user characteristic analysis unit 172 may generate vibration control data by correcting the input data of each actuator 251 included in the vibration data on the basis of the vibration characteristic map.

Additionally, the configuration of the information processing system 10 is changeable. For example, the information processing device 11 may include the vibration presenting device 14. Alternatively, for example, the vibration presenting device 14 may include all or some of the functions of the information processing device 11. For example, the vibration presenting device 14 may include the analysis unit 161 and the vibration control unit 183 of FIG. 3.

Moreover, for example, the vibration presented by each actuator 251 may be corrected by moving each actuator 251 and changing the arrangement on the basis of the load of each actuator 251. For example, when the user is sitting on the seat surface 241, each actuator 251 is moved to a position where the load is within the expected range.

Additionally, for example, the vibration presented by each actuator 251 may be corrected by controlling both the vibration and the position of each actuator 251.

Moreover, the content to be presented does not necessarily have to include both video and audio, and may include only one.

9. Other

<Method of Providing Software, and Other>

The above-described series of processing may be performed by hardware or software. In a case where the series of processing is performed by software, a program that is included in the software is installed on the information processing device 11.

In the information processing device 11, for example, the CPU 101 loads a program recorded in the storage unit 108 to the RAM 103 through the input/output interface 105 and the bus 104, and executes the above-described series of processing.

The program executed by the information processing device 11 (CPU 101) can be provided by being recorded on the removable medium 111 as a package medium or the like, for example. Additionally, the program can be provided through a wired or wireless transmission medium such as a local area network, the Internet, or digital satellite broadcasting.

In the information processing device 11, the program can be installed in the storage unit 108 through the input/output interface 105 by attaching the removable medium 111 to the drive 210. Additionally, the program can be received by the communication unit 109 through a wired or wireless transmission medium and be installed in the storage unit 108. In addition, the program can be installed in advance in the ROM 102 or the storage unit 108.

Note that the program executed by the information processing device 11 may be a program that performs processing in chronological order according to the order described in the present specification, or a program that performs processing in parallel, or at a necessary timing such as when a call is made.

Additionally, in the present specification, a system means a collection of multiple components (devices, modules (parts), and the like), and it does not matter whether or not all the components are in the same case. Accordingly, multiple devices housed in separate cases and connected through a network, and one device housing multiple modules in one case are both systems.

Moreover, the embodiment of the present technology is not limited to the above-described embodiments, and various modifications can be made without departing from the scope of the present technology.

For example, the present technology can have a cloud computing configuration in which one function is shared and processed by multiple devices through a network.

Additionally, each step described in the above-described flowchart can be executed by one device or be executed in a shared manner by multiple devices.

Moreover, in a case where multiple processes are included in one step, the multiple processes included in one step can be executed by one device or be executed in a shared manner by multiple devices.

<Exemplary Combination of Configuration>

The present technology can also be configured as follows.

(1)

An information processing device including a vibration control unit that individually controls vibration presented to a user in association with a content by each of a plurality of vibration presenting units on the basis of a characteristic of the user and positions of the vibration presenting units.

(2)

The information processing device according to (1) above, in which the vibration control unit controls the vibration presented by each of the vibration presenting units on the basis of a load applied to each of the vibration presenting units by the user.

(3)

The information processing device according to (2) above further including a user characteristic analysis unit that analyzes the load of each of the vibration presenting units.

(4)

The information processing device according to (3) above, in which the user characteristic analysis unit estimates the load of each of the vibration presenting units on the basis of user information regarding the user.

(5)

The information processing device according to (4) above, in which the user characteristic analysis unit estimates the load of each of the vibration presenting units for each scene of the content on the basis of the user information, and the vibration control unit controls the vibration presented by each of the vibration presenting units on the basis of the load of each of the vibration presenting units for each scene of the content.

(6)

The information processing device according to (5) above, in which the user characteristic analysis unit estimates the load of each of the vibration presenting units on the basis of a scene type of the content.

(7)

The information processing device according to any one of (4) to (6) above, in which the user information includes information related to a physical characteristic of the user.

(8)

The information processing device according to (3) above, in which the user characteristic analysis unit detects the load of each of the vibration presenting units on the basis of sensor data.

(9)

The information processing device according to (8) above, in which the user characteristic analysis unit detects the load of each of the vibration presenting units in each posture of the user, and the vibration control unit controls the vibration presented by each of the vibration presenting units on the basis of the posture of the user.

(10)

The information processing device according to (9) above, in which the user characteristic analysis unit estimates a posture of the user for each scene of the content, and the vibration control unit controls the vibration presented by each of the vibration presenting units on the basis of the estimated posture of the user.

(11)

The information processing device according to (8) above, in which the user characteristic analysis unit detects the load of each of the vibration presenting units for each scene type of the content, and the vibration control unit controls the vibration presented by each of the vibration presenting units on the basis of the load of each of the vibration presenting units for each scene of the content.

(12)

The information processing device according to any one of (3) to (11) above, in which the user characteristic analysis unit estimates a vibration characteristic of each of the vibration presenting units on the basis of the load of each of the vibration presenting units, and the vibration control unit controls the vibration presented by each of the vibration presenting units on the basis of the vibration characteristic of each of the vibration presenting units.

(13)

The information processing device according to (12) above further including a vibration characteristic analysis unit that analyzes the vibration characteristic of each of the vibration presenting units, in which the user characteristic analysis unit estimates the vibration characteristic of each of the vibration presenting units on the basis of the load of each of the vibration presenting units and the analysis result of the vibration characteristic of each of the vibration presenting units.

(14)

The information processing device according to any one of (3) to (13) above, in which before presenting the content, the vibration control unit generates vibration control data used for controlling the vibration presented by each of the vibration presenting units on the basis of the analysis result of the load of each of the vibration presenting units.

(15)

The information processing device according to any one of (1) to (14) above, in which the vibration control unit controls an amplitude and a frequency of the vibration presented by each of the vibration presenting units.

(16)

The information processing device according to any one of (1) to (15) above, in which the content includes at least one of video or audio.

(17)

The information processing device according to any one of (1) to (16) above, in which a vibration presenting device including the plurality of vibration presenting units is a device that supports the user's body, a device worn by the user, or a device operated by the user.

(18)

The information processing device according to (17) above further including the vibration presenting device.

(19)

An information processing method including individually controlling, by an information processing device, vibration presented to a user in association with a content by each of a plurality of vibration presenting units on the basis of a characteristic of the user and positions of the vibration presenting units.

(20)

A computer-readable recording medium that records a program to perform processing of individually controlling vibration presented to a user in association with a content by each of a plurality of vibration presenting units on the basis of a characteristic of the user and positions of the vibration presenting units.

Note that the effect described in the present specification is merely an illustration and is not restrictive. Hence, other effects can be obtained.

REFERENCE SIGNS LIST

10 Information processing system
11 Information processing device
12 Display device
13 Audio output device
14 Vibration presenting device
101 CPU
151 Information processing unit
161 Analysis unit
162 Output control unit
171 Vibration characteristic analysis unit
172 User characteristic analysis unit
181 Display control unit
182 Audio control unit
183 Vibration control unit
202-1 to 202-n Vibration presenting unit 203 Sensing unit
241 Seat surface
251-1 to 251-9 Actuator

The invention claimed is:

1. An information processing device comprising:
a vibration control unit that individually controls vibration presented to a user in association with a content by each vibration presenting units of a plurality of vibration presenting units on a basis of a characteristic of the user and positions of the vibration presenting units, and
a user characteristic analysis unit configured to estimate a respective estimated posture of the user for each scene of the content,
wherein the vibration control unit individually controls the vibration presented by each of the vibration presenting units on a basis of each scene of the content and the respective estimated posture of the user, and
wherein the vibration control unit and the user characteristic analysis unit are implemented via at least one processor.

2. The information processing device according to claim 1,
wherein the vibration control unit controls the vibration presented by each of the vibration presenting units on a basis of a load applied to each of the vibration presenting units by the user.

3. The information processing device according to claim 2:
wherein the user characteristic analysis unit analyzes the load of each of the vibration presenting units.

4. The information processing device according to claim 3,
wherein the user characteristic analysis unit estimates the load of each of the vibration presenting units on a basis of user information regarding the user.

5. The information processing device according to claim 4,
wherein the user characteristic analysis unit estimates the load of each of the vibration presenting units for each scene of the content on a basis of the user information, and
wherein the vibration control unit controls the vibration presented by each of the vibration presenting units on a basis of the load of each of the vibration presenting units for each scene of the content.

6. The information processing device according to claim 5,
wherein the user characteristic analysis unit estimates the load of each of the vibration presenting units on a basis of a scene type of the content.

7. The information processing device according to claim 4,
wherein the user information includes information related to a physical characteristic of the user.

8. The information processing device according to claim 3,
wherein the user characteristic analysis unit detects the load of each of the vibration presenting units on a basis of sensor data.

9. The information processing device according to claim 8,
wherein the user characteristic analysis unit detects the load of each of the vibration presenting units in each posture of the user, and
wherein the vibration control unit controls the vibration presented by each of the vibration presenting units on a basis of the posture of the detected load in each estimated posture of the user.

10. The information processing device according to claim 8,
wherein the user characteristic analysis unit detects the load of each of the vibration presenting units for each scene type of the content, and
wherein the vibration control unit controls the vibration presented by each of the vibration presenting units on a basis of the load of each of the vibration presenting units for each scene of the content.

11. The information processing device according to claim 3,
wherein the user characteristic analysis unit estimates a vibration characteristic of each of the vibration presenting units on a basis of the load of each of the vibration presenting units, and
wherein the vibration control unit controls the vibration presented by each of the vibration presenting units on a basis of the vibration characteristic of each of the vibration presenting units.

12. The information processing device according to claim 11 further comprising:
a vibration characteristic analysis unit configured to analyze the vibration characteristic of each of the vibration presenting units, wherein
the user characteristic analysis unit estimates the vibration characteristic of each of the vibration presenting units on a basis of the load of each of the vibration presenting units and the analysis result of the vibration characteristic of each of the vibration presenting units,
wherein the vibration characteristic analysis unit is implemented via at least one processor.

13. The information processing device according to claim 3,
wherein before presenting the content, the vibration control unit vibration control data used for controlling the vibration presented by each of the vibration presenting units on a basis of the analysis result of the load of each of the vibration presenting units.

14. The information processing device according to claim 1,
wherein the vibration control unit controls an amplitude and a frequency of the vibration presented by each of the vibration presenting units.

15. The information processing device according to claim 1,
wherein the content includes at least one of video or audio.

16. The information processing device according to claim 1, further comprising:
a vibration presenting device including the plurality of vibration presenting units.

17. The information processing device according to claim 16, wherein the vibration presenting device is a device that supports the user's body, a device worn by the user, or a device operated by the user.

18. An information processing method comprising:
individually controlling, by an information processing device, vibration presented to a user in association with a content by each vibration presenting units of a plurality of vibration presenting units on a basis of a characteristic of the user and positions of the vibration presenting units, and
estimating, by a user characteristic analysis unit, a respective estimated posture of the user for each scene of the content, wherein the vibration presented by each of the vibration presenting units is individually controlled on a basis of each scene of the content and the respective estimated posture of the user.

19. A non-transitory computer-readable recording medium having embodied thereon a program, which when executed by a computer causes the computer to perform a method, the method comprising:

individually controlling vibration presented to a user in association with a content by each vibration presenting unit of a plurality of vibration presenting units on a basis of a characteristic of the user and positions of the vibration presenting units, and estimating a respective estimated posture of the user for each scene of the content, wherein the vibration presented by each of the vibration presenting units is individually controlled on a basis of each scene of the content and the respective estimated posture of the user.

20. The information processing device according to claim 1,
wherein the use characteristic analysis unit estimates the load of each of the vibration presenting units on a basis of a scene type of each scene of the content.

* * * * *